United States Patent
Kocienda et al.

(10) Patent No.: US 11,948,578 B2
(45) Date of Patent: Apr. 2, 2024

(54) COMPOSING ELECTRONIC MESSAGES BASED ON SPEECH INPUT

(71) Applicant: Humane, Inc., San Francisco, CA (US)

(72) Inventors: Kenneth Luke Kocienda, Mill Valley, CA (US); Imran A. Chaudhri, San Francisco, CA (US)

(73) Assignee: Humane, Inc., San Francisco, CA (US)

(*) Notice: Subject to any disclaimer, the term of this patent is extended or adjusted under 35 U.S.C. 154(b) by 0 days.

(21) Appl. No.: 17/687,519

(22) Filed: Mar. 4, 2022

(65) Prior Publication Data

US 2023/0282214 A1    Sep. 7, 2023

(51) Int. Cl.
*G10L 15/00*     (2013.01)
*G10L 15/26*     (2006.01)
*H04L 51/046*    (2022.01)
*H04L 51/10*     (2022.01)
*H04W 4/12*      (2009.01)

(52) U.S. Cl.
CPC ............ *G10L 15/26* (2013.01); *H04L 51/046* (2013.01); *H04L 51/10* (2013.01); *H04W 4/12* (2013.01)

(58) Field of Classification Search
CPC ......... H04L 51/00; H04L 51/08; G10L 15/22; G10L 15/26
See application file for complete search history.

(56) References Cited

U.S. PATENT DOCUMENTS

| | | | |
|---|---|---|---|
| 8,224,654 B1* | 7/2012 | LeBeau | G10L 15/26 704/235 |
| 10,002,611 B1* | 6/2018 | Typrin | H04L 51/10 |
| 10,673,794 B2* | 6/2020 | Knudson | G06F 40/295 |
| 10,917,758 B1* | 2/2021 | Taylor | G10L 15/26 |
| 2013/0275528 A1* | 10/2013 | Miner | G06Q 30/0201 709/206 |
| 2014/0163980 A1* | 6/2014 | Tesch | G10L 25/57 704/235 |

(Continued)

OTHER PUBLICATIONS

Kanel, "Sixth Sense Technology," Thesis for the Bachelor Degree of Engineering in Information and Technology, Centria University of Applied Sciences, May 2014, 46 pages.

(Continued)

*Primary Examiner* — Daniel Abebe
(74) *Attorney, Agent, or Firm* — Fish & Richardson P.C.

(57) ABSTRACT

Systems, methods, devices and non-transitory, computer-readable storage mediums are disclosed for a wearable multimedia device and cloud computing platform with an application ecosystem for processing multimedia data captured by the wearable multimedia device. In an embodiment, a wearable multimedia device receives a first speech input from a user, including a first command to generate a message, and first content for inclusion in the message. The device determines second content for inclusion in the message based on the first content, and generates the message such that the messages includes the first and second content. The device receives a second speech input from the user, including a second command to modify the message. In response, the device determines third content for inclusion in the message based on the first content and/or the second content, and modifies the message using the third content. The device transmits the modified message to a recipient.

23 Claims, 19 Drawing Sheets

(56) References Cited

U.S. PATENT DOCUMENTS

| | | | | |
|---|---|---|---|---|
| 2014/0372115 | A1* | 12/2014 | LeBeau | H04M 1/72436 704/235 |
| 2015/0148084 | A1* | 5/2015 | Arkko | H04M 1/645 455/466 |
| 2016/0112359 | A1* | 4/2016 | Allen | H04L 51/214 709/206 |
| 2016/0182434 | A1* | 6/2016 | Systrom | H04L 51/52 709/206 |
| 2017/0123487 | A1 | 5/2017 | Hazra et al. | |
| 2017/0310811 | A1* | 10/2017 | Zhong | G06F 3/0485 |
| 2018/0060299 | A1* | 3/2018 | Bastide | H04L 51/52 |
| 2018/0268059 | A1* | 9/2018 | Lipsky | H04L 67/535 |
| 2020/0152181 | A1* | 5/2020 | Woo | G10L 15/28 |
| 2020/0228472 | A1* | 7/2020 | Pascal | H04W 4/12 |
| 2021/0149627 | A1* | 5/2021 | Jang | H04L 51/224 |

OTHER PUBLICATIONS

Mann et al., "Telepointer: Hands-Free Completely Self Contained Wearable Visual Augmented Reality without Headwear and without any Infrastructural Reliance", IEEE Fourth International Symposium on Wearable Computers, Atlanta, Ga, USA, Oct. 16-17, 2000, 4 pages.

Mann, "Wearable Computing: A First Step Toward Personal Imaging," IEEE Computer, Feb. 1997, 30(2):25-32.

Mann, "Wearable, tetherless computer-mediated reality," American Association of Artificial Intelligence Technical Report, Feb. 1996, 62-69, 8 pages.

Metavision.com [online], "Sensularity with a Sixth Sense," available on or before Apr. 7, 2015, via Internet Archive: Wayback Machine URL <http://web.archive.org/web/20170901072037/https://blog.metavision.com/professor-steve-mann-society-of-sensularity-with-a-sixth-sense/> retrieved on Apr. 25, 2023, URL <https://blog.metavision.com/professor-steve-mann-society-of-sensularity-with-a-sixth-sense/>, 4 pages.

Mistry et al., "WUW—wear Ur world: a wearable gestural interface", Proceedings of the 27th international conference Extended Abstracts on Human Factors in Computing Systems—CHI EA '09, Boston, MA, USA, Apr. 4-9, 2009, 6 pages.

Shetty et al., "Sixth Sense Technology," International Journal of Science and Research, Dec. 2014, 3(12):1068-1073.

International Search Report and Written Opinion in International Appln. No. PCT/US2023/014482, dated Apr. 6, 2023, 7 pages.

* cited by examiner

| Streams | Users | Userdevices | Devices |
|---|---|---|---|
| streamid | userid | userid | deviceid |
| deviceid | deviceid | deviceid | started |
| start | email | | state |
| end | fname | | modified |
| lat | lname | | created |
| lon | | | |
| attributes | | | |
| entities | | | |

| ProcessingResults | Entities | EntityTypes | EntityAssociations |
|---|---|---|---|
| streamid | entityID | person | entity 1 |
| ai | userid | place | entity 2 |
| result | entityName | thing | |
| callback | entityType | event | |
| duration | entityAttribute | | |
| accuracy | | | |

FIG. 5

COMPOSING ELECTRONIC MESSAGES BASED ON SPEECH INPUT

TECHNICAL FIELD

This disclosure relates generally to composing electronic messages based on speech input by a user.

BACKGROUND

Mobile devices (e.g., wearable multimedia devices, smart phones, tablet computers, etc.) can be used to transmit electronic messages between users. As an example, a first user can use a first mobile device to compose an electronic message intended for a second user. Further, the first user can instruct the first mobile device to transmit the electronic message to a second device associated with the second user (e.g., using a communications network, such as the Internet). The second user can retrieve and review the electronic message using the second device.

SUMMARY

Systems, methods, devices and non-transitory, computer-readable storage mediums are disclosed for a wearable multimedia device and cloud computing platform with an application ecosystem for processing multimedia data captured by the wearable multimedia device.

In general, a wearable multimedia device can capture multimedia data of spontaneous moments and transactions with minimal interaction by the user. Further, the wearable multimedia device can automatically edit and format the multimedia data on a cloud computing platform based on user preferences, and make the multimedia data available to the user for replay on a variety of user playback devices. In some implementations, the data editing and/or processing can be performed by an ecosystem of applications that are proprietary and/or provided/licensed from third party developers. Further, the application ecosystem can provide various access points (e.g., a website, portal, API) that allow the third party developers to upload, verify and update their applications. Further, the cloud computing platform can automatically build a custom processing pipeline for each multimedia data stream using one or more of the ecosystem applications, user preferences and other information (e.g., the type or format of the data, the quantity and quality of the data).

Additionally, the wearable multimedia device can include one or more cameras and/or depth sensor configured to detect objects and/or gestures performed by the user (e.g., using the user's hands), and perform or infer various actions based on the detections. As an example, based on the detections, the wearable multimedia device can label objects in camera images, control the operation of the wearable multimedia device, and/or control the operation of other devices communicatively coupled to the wearable multimedia device.

Further, in some implementations, the wearable multimedia device does not include a display, thereby allowing the user to continue interacting with friends, family, and co-workers without being immersed in a display. As such, the wearable multimedia device takes a different technical approach than, for example, smart goggles or glasses for augmented reality (AR) and virtual reality (VR), where the user is further detached from the real-world environment. To facilitate collaboration with others and to compensate for no display, the wearable multimedia computer can include a laser projection system that projects a laser projection onto any surface, including tables, walls and even the user's palm. The laser projection can label objects, provide text or instructions related to the objects, and provide a virtual interface (VI) that allows the user to compose messages, control other devices, or simply share and discuss content with others.

For instance, the wearable multimedia device can include a projector subsystem configured to present information visually to a user in the form of projected light. As an example, the projector subsystem can project light onto a surface (e.g., a surface of a user's hand, such as the user's palm) according to a particular spatial and/or temporal pattern, such that the user perceives a VI with one or more user interface elements. Further, the user can perform gestures to interact with the VI.

In some implementations, a user can use the wearable multimedia device to compose, transmit, and/or receive electronic messages. Example electronic messages include e-mails, text messages (e.g., Short Message Service (SMS) messages, Multimedia Messaging Service (MMS) messages, Rich Communication Services (RCS) messages, etc.), chat messages, or any other type of electronic communication including text, images, videos, audio, and/or other any other content.

As an example, a first user can use a wearable multimedia device to compose an electronic message intended for a second user. Further, the first user can instruct the wearable multimedia device to transmit the electronic message to a second device associated with the second user (e.g., using a communications network, such as the Internet). The second user can retrieve and review the electronic message using the second device.

In some implementations, a user can compose an electronic messages using one or more spoken commands. For example, a user can provide speech input to a wearable multimedia device that includes instructions to generate an electronic message and content for inclusion in the electronic message. The wearable multimedia device can detect the speech input (e.g., using one or more microphones) and generate a draft of the electronic message for review by the user. Further, the user can provide additional speech input to the wearable multimedia device that includes instructions to modify the electronic message. The wearable multimedia device can detect the speech and modify the draft of the electronic message accordingly.

In some implementations, the wearable multimedia device can receive speech input from the user, and infer content for inclusion in an electronic message based on the speech input. For example, the wearable multimedia device can receive speech input from the user that specifies one or more content items for inclusion in the electronic message. Based on the speech input and other contextual information, the wearable multimedia device can infer one or more additional content items for inclusion in the electronic message. Further, the wearable multimedia device can generate an electronic message such that it includes at least some of the content specified by the user and at least some of the inferred content.

The implementations described herein can provide various technical benefits. For instance, these techniques allow a wearable multimedia device to infer content for an electronic message, without requiring that a user expressly specify that content. Accordingly, the user can compose and transmit an electronic message using fewer speech inputs and/or shorter speech inputs (e.g., compared to composing and transmitting an electronic message absent the techniques described in this disclosure). Thus, the user can compose and transmit an electronic message more quickly and intuitively.

Further, these techniques can reduce the resources expended by the wearable multimedia device during operation. For instance, a wearable multimedia device expends resources—such as computational resources (e.g., CPU cycles), memory resources, storage resources, network resources, and/or battery resources—to detect and interpret a user's speech inputs and to carry out operations specified by the speech inputs. By reducing the number of speech inputs and/or the length of the speech inputs that are needed to generate and transmit an electronic message, the wearable multimedia device can correspondingly reduce its expenditure of these resources and operate in a more efficient manner.

In at least some embodiments, a method includes: receiving, using a microphone of a wearable multimedia device, a first speech input from a user, where the first speech input includes: a first command to generate a message, and first content for inclusion in the message; determining, by the wearable multimedia device based on the first content, second content for inclusion in the message; generating, by the wearable multimedia device, the message, where the message includes the first content and the second content; receiving, using the microphone, a second speech input from the user, where the second speech input includes a second command to modify the message; responsive to receiving the second speech input: determining, by the wearable multimedia device based on at least one of the first content or the second content, third content for inclusion in the message, and modifying, by the wearable multimedia device, the message using the third content; and transmitting, by the wearable multimedia device, the modified message to one or more recipients.

Embodiments can include one or more of the following features.

In some embodiments, the first content can include a first category of data, and the second content can include a second category of data different from the first category of data, where the second content is not included in the first speech input.

In some embodiments, the first category of data can be one of: the one or more recipients, a location associated with the message, or a time associated with the message.

In some embodiments, the second category of data can be another one of: the one or more recipients, the location associated with the message, or the time associated with the message.

In some embodiments, the second speech input can include at least one of: a modification to the one or more recipients, a modification to the location associated with the message, or a modification to the time associated with the message.

In some embodiments, the second command can include a command to add a third category of data to the message. The third category of data can different from the first category of data and the second category of data.

In some embodiments, content of the modified message can be different from either of the first speech input or the second speech input.

In some embodiments, the first content can include an indication of the one or more recipients. Generating the second content can include inferring the second content based on the one or more recipients.

In some embodiments, inferring the second content based on the one or more recipients can include: obtaining calendar data associated with the one or more recipients, and inferring the second content based on the calendar data.

In some embodiments, the second content can include an invitation to an event and a time associated with the event. The time can be inferred based on the calendar data.

In some embodiments, inferring the second content based on the one or more recipients can include: obtaining historical data associated with the one or more recipients, and inferring the second content based on the historical data.

In some embodiments, the second content can include an invitation to an event and a venue associated with the event. The venue can be inferred based on the historical data.

In some embodiments, inferring the second content based on the one or more recipients can include: obtaining first location data associated with the user, obtaining second location associated with the one or more recipients, and inferring the second content based on the first location data and the second location data.

In some embodiments, the second content can include an invitation to an event and a venue associated with the event. The venue can be inferred based on the first location data and the second location data.

In some embodiments, the second content can include an invitation to an event and a time associated with the event. The time can be inferred based on the first location data and the second location data.

In some embodiments, the second content can include a venue associated with the event. The venue can be inferred based on weather data.

In some embodiments, inferring the second content based on the one or more recipients can include: determining a relationship between the user and the one or more recipients, and inferring the second content based on the relationship between the user and the one or more recipients.

In some embodiments, the relationship can be at least one of: a familial relationship, or a workplace relationship.

In some embodiments, the first content can include an indication of a location associated with the message. Generating the second content can include inferring the second content based on the location.

In some embodiments, inferring the second content based on the one or more recipients can include: obtaining map data associated with the location, and inferring the second content based on the map data.

In some embodiments, the second content can include an invitation to an event and a venue associated with the event. The venue can be inferred based on the map data.

In some embodiments, the method can further include: determining, based on the one or more recipients, at least one of a salutation, a valediction, or a signature for inclusion in the message. The message can further include at least one of the salutation, the valediction, or the signature.

In some embodiments, the method can further include determining a transmission time for transmitting the modified message. The transmission time can be determined based on an availability of the one or more recipients.

In at least some embodiments, a wearable multimedia device includes: at least one processor; and memory storing instructions that, when executed by the at least one processor, cause the at least one processor to perform various operations, including one or more of the methods described herein.

In at least some embodiments, one or more non-transitory computer-readable media store instructions that, when executed by at least one processor, cause the at least one processor to perform operations, including one or more of the methods described herein.

The details of the disclosed embodiments are set forth in the accompanying drawings and the description below. Other features, objects and advantages are apparent from the description, drawings and claims.

DESCRIPTION OF DRAWINGS

FIG. 5 illustrates data objects used by the data processing system of FIG. 2, according to an embodiment.

The same reference symbol used in various drawings indicates like elements.

DETAILED DESCRIPTION

Example Wearable Multimedia Device

Figure 1:
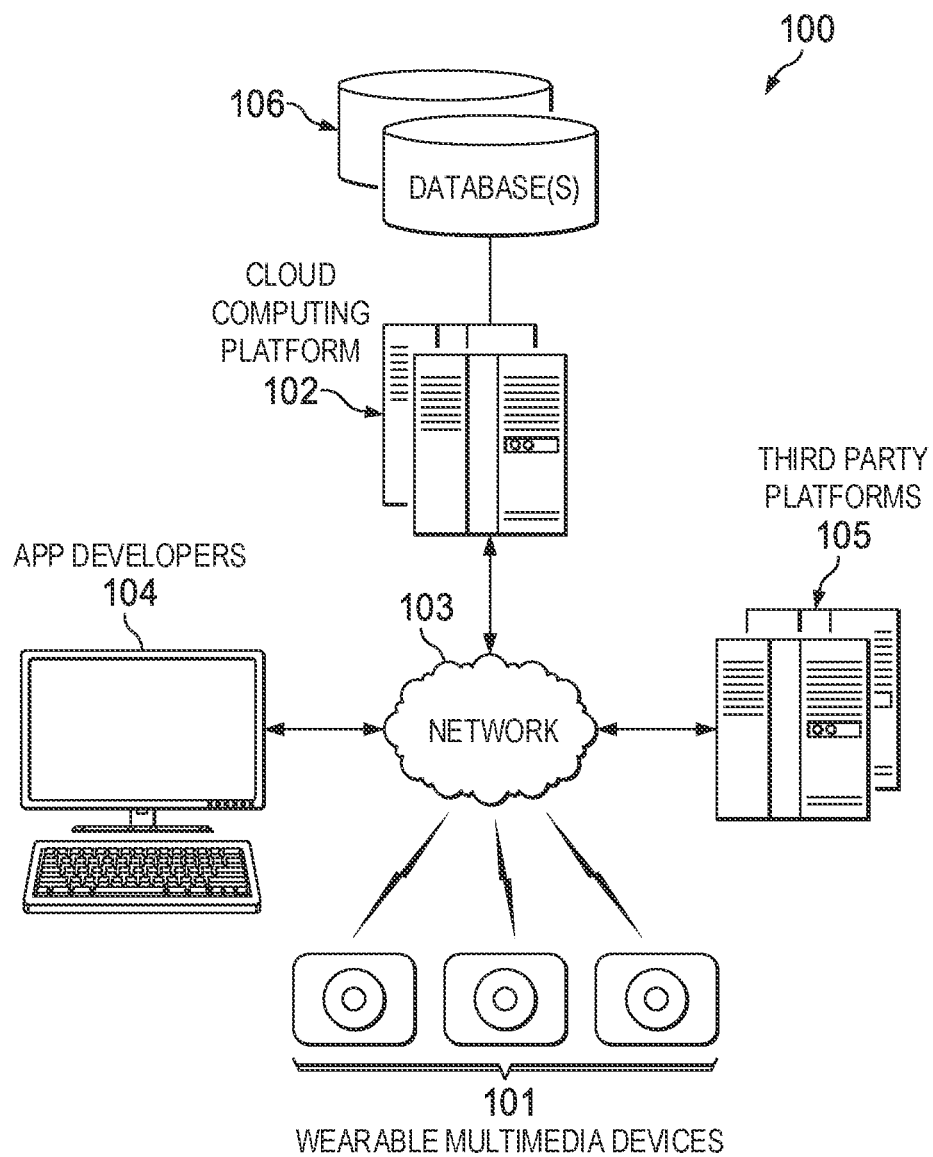
FIG. 1 is a block diagram of an operating environment for a wearable multimedia device and cloud computing platform with an application ecosystem for processing multimedia data captured by the wearable multimedia device, according to an embodiment

The features and processes described herein can be implemented on a wearable multimedia device. In an embodiment, the wearable multimedia device is a lightweight, small form factor, battery-powered device that can be attached to a user's clothing or an object using a tension clasp, interlocking pin back, magnet, or any other attachment mechanism. The wearable multimedia device includes a digital image capture device (e.g., a camera with a 180° FOV with optical image stabilizer (OIS)) that allows a user to spontaneously and/or continuously capture multimedia data (e.g., video, audio, depth data, biometric data) of life events ("moments") and document transactions (e.g., financial transactions) with minimal user interaction or device set-up.

The multimedia data ("context data") captured by the wireless multimedia device is uploaded to a cloud computing platform with an application ecosystem that allows the context data to be processed, edited and formatted by one or more applications (e.g., Artificial Intelligence (AI) applications) into any desired presentation format (e.g., single image, image stream, video clip, audio clip, multimedia presentation, image gallery) that can be downloaded and replayed on the wearable multimedia device and/or any other playback device. For example, the cloud computing platform can transform video data and audio data into any desired filmmaking style (e.g., documentary, lifestyle, candid, photojournalism, sport, street) specified by the user.

In an embodiment, the context data is processed by server computer(s) of the cloud computing platform based on user preferences. For example, images can be color graded, stabilized and cropped perfectly to the moment the user wants to relive based on the user preferences. The user preferences can be stored in a user profile created by the user through an online account accessible through a website or portal, or the user preferences can be learned by the platform over time (e.g., using machine learning). In an embodiment, the cloud computing platform is a scalable distributed computing environment. For example, the cloud computing platform can be a distributed streaming platform (e.g., Apache Kafka™) with real-time streaming data pipelines and streaming applications that transform or react to streams of data.

In an embodiment, the user can start and stop a context data capture session on the wearable multimedia device with a simple touch gesture (e.g., a tap or swipe), by speaking a command or any other input mechanism. All or portions of the wearable multimedia device can automatically power down when it detects that it is not being worn by the user using one or more sensors (e.g., proximity sensor, optical sensor, accelerometers, gyroscopes).

The context data can be encrypted and compressed and stored in an online database associated with a user account using any desired encryption or compression technology. The context data can be stored for a specified period of time that can be set by the user. The user can be provided through a website, portal or mobile application with opt-in mechanisms and other tools for managing their data and data privacy.

In an embodiment, the context data includes point cloud data to provide three-dimensional (3D) surface mapped objects that can be processed using, for example, augmented reality (AR) and virtual reality (VR) applications in the application ecosystem. The point cloud data can be generated by a depth sensor (e.g., LiDAR or Time of Flight (TOF)) embedded on the wearable multimedia device.

In an embodiment, the wearable multimedia device includes a Global Navigation Satellite System (GNSS) receiver (e.g., Global Positioning System (GPS)) and one or more inertial sensors (e.g., accelerometers, gyroscopes) for determining the location and orientation of the user wearing the device when the context data was captured. In an embodiment, one or more images in the context data can be used by a localization application, such as a visual odometry application, in the application ecosystem to determine the position and orientation of the user.

In an embodiment, the wearable multimedia device can also include one or more environmental sensors, including but not limited to: an ambient light sensor, magnetometer, pressure sensor, voice activity detector, etc. This sensor data can be included in the context data to enrich a content presentation with additional information that can be used to capture the moment.

In an embodiment, the wearable multimedia device can include one or more biometric sensors, such as a heart rate sensor, fingerprint scanner, etc. This sensor data can be included in the context data to document a transaction or to indicate the emotional state of the user during the moment (e.g., elevated heart rate could indicate excitement or fear).

In an embodiment, the wearable multimedia device includes a headphone jack connecting a headset or earbuds, and one or more microphones for receiving voice command and capturing ambient audio. In an alternative embodiment, the wearable multimedia device includes short range communication technology, including but not limited to Bluetooth, IEEE 802.15.4 (ZigBee™) and near field communications (NFC). The short range communication technology can be used to wirelessly connect to a wireless headset or earbuds in addition to, or in place of the headphone jack, and/or can wirelessly connect to any other external device (e.g., a computer, printer, projector, television and other wearable devices).

In an embodiment, the wearable multimedia device includes a wireless transceiver and communication protocol stacks for a variety of communication technologies, including WiFi, 3G, 4G and 5G communication technologies. In an embodiment, the headset or earbuds also include sensors (e.g., biometric sensors, inertial sensors) that provide information about the direction the user is facing, to provide commands with head gestures or playback of spatial audio, etc. In an embodiment, the camera direction can be controlled by the head gestures, such that the camera view follows the user's view direction. In an embodiment, the wearable multimedia device can be embedded in or attached to the user's glasses.

In an embodiment, the wearable multimedia device includes a projector (e.g., a laser projector, LCoS, DLP, LCD), or can be wired or wirelessly coupled to an external projector, that allows the user to replay a moment on a surface such as a wall or table top or on a surface of the user's hand (e.g., the user's palm). In another embodiment, the wearable multimedia device includes an output port that can connect to a projector or other output device.

In an embodiment, the wearable multimedia capture device includes a touch surface responsive to touch gestures (e.g., a tap, multi-tap or swipe gesture). The wearable multimedia device may include a small display for presenting information and one or more light indicators to indicate on/off status, power conditions or any other desired status.

In an embodiment, the cloud computing platform can be driven by context-based gestures (e.g., air gesture) in combination with speech queries, such as the user pointing to an object in their environment and saying: "What is that building?" The cloud computing platform uses the air gesture to narrow the scope of the viewport of the camera and isolate the building. One or more images of the building are captured, optionally cropped (e.g., to protect privacy), and sent to the cloud computing platform where an image recognition application can run an image query and store or return the results to the user. Air and touch gestures can also be performed on a projected ephemeral display, for example, responding to user interface elements projected on a surface.

In an embodiment, the context data can be encrypted on the device and on the cloud computing platform so that only the user or any authorized viewer can relive the moment on a connected screen (e.g., smartphone, computer, television, etc.) or as a projection on a surface. An example architecture for the wearable multimedia device is described in reference to FIG. 8.

In addition to personal life events, the wearable multimedia device simplifies the capture of financial transactions that are currently handled by smartphones. The capture of every day transactions (e.g., business transactions, micro transactions) is made simpler, faster and more fluid by using sight assisted contextual awareness provided by the wearable multimedia device. For example, when the user engages in a financial transaction (e.g., making a purchase), the wearable multimedia device will generate data memorializing the financial transaction, including a date, time, amount, digital images or video of the parties, audio (e.g., user commentary describing the transaction) and environment data (e.g., location data). The data can be included in a multimedia data stream sent to the cloud computing platform, where it can be stored online and/or processed by one or more financial applications (e.g., financial management, accounting, budget, tax preparation, inventory, etc.).

In an embodiment, the cloud computing platform provides graphical user interfaces on a website or portal that allows various third party application developers to upload, update and manage their applications in an application ecosystem. Some example applications can include but are not limited to: personal live broadcasting (e.g., Instagram™ Life, Snapchat™), senior monitoring (e.g., to ensure that a loved one has taken their medicine), memory recall (e.g., showing a child's soccer game from last week) and personal guide (e.g., AI enabled personal guide that knows the location of the user and guides the user to perform an action).

In an embodiment, the wearable multimedia device includes one or more microphones and a headset. In some embodiments, the headset wire includes the microphone. In an embodiment, a digital assistant is implemented on the wearable multimedia device that responds to user queries, requests and commands. For example, the wearable multimedia device worn by a parent captures moment context data for a child's soccer game, and in particular a "moment" where the child scores a goal. The user can request (e.g., using a speech command) that the platform create a video clip of the goal and store it in their user account. Without any further actions by the user, the cloud computing platform identifies the correct portion of the moment context data (e.g., using face recognition, visual or audio cues) when the goal is scored, edits the moment context data into a video clip, and stores the video clip in a database associated with the user account.

In an embodiment, the device can include photovoltaic surface technology to sustain battery life and inductive charging circuitry (e.g., Qi) to allow for inductive charging on charge mats and wireless over-the-air (OTA) charging.

In an embodiment, the wearable multimedia device is configured to magnetically couple or mate with a rechargeable portable battery pack. The portable battery pack includes a mating surface that has permanent magnet (e.g., N pole) disposed thereon, and the wearable multimedia device has a corresponding mating surface that has permanent magnet (e.g., S pole) disposed thereon. Any number of permanent magnets having any desired shape or size can be arranged in any desired pattern on the mating surfaces.

The permanent magnets hold portable battery pack and wearable multimedia device together in a mated configuration with clothing (e.g., a user's shirt) therebetween. In an embodiment, the portable battery pack and wearable multimedia device have the same mating surface dimensions, such that there is no overhanging portions when in a mated configuration. A user magnetically fastens the wearable multimedia device to their clothing by placing the portable battery pack underneath their clothing and placing the wearable multimedia device on top of portable battery pack outside their clothing, such that permanent magnets attract each other through the clothing.

In an embodiment, the portable battery pack has a built-in wireless power transmitter which is used to wirelessly power the wearable multimedia device while in the mated configuration using the principle of resonant inductive coupling. In an embodiment, the wearable multimedia device includes a built-in wireless power receiver which is used to receive power from the portable battery pack while in the mated configuration.

System Overview

FIG. 1 is a block diagram of an operating environment for a wearable multimedia device and cloud computing platform with an application ecosystem for processing multimedia data captured by the wearable multimedia device, according to an embodiment. Operating environment 100 includes wearable multimedia devices 101, cloud computing platform 102, network 103, application ("app") developers 104 and third party platforms 105. Cloud computing platform 102 is coupled to one or more databases 106 for storing context data uploaded by wearable multimedia devices 101.

As previously described, wearable multimedia devices 101 are lightweight, small form factor, battery-powered devices that can be attached to a user's clothing or an object using a tension clasp, interlocking pin back, magnet or any other attachment mechanism. Wearable multimedia devices 101 include a digital image capture device (e.g., a camera with a 180° FOV and OIS) that allows a user to spontaneously capture multimedia data (e.g., video, audio, depth data) of "moments" and document every day transactions (e.g., financial transactions) with minimal user interaction or device set-up. The context data captured by wireless multimedia devices 101 are uploaded to cloud computing platform 102. Cloud computing platform 102 includes an application ecosystem that allows the context data to be processed, edited and formatted by one or more server side applications into any desired presentation format (e.g., single image, image stream, video clip, audio clip, multimedia presentation, images gallery) that can be downloaded and replayed on the wearable multimedia device and/or other playback device.

By way of example, at a child's birthday party a parent can clip the wearable multimedia device on their clothing (or attached the device to a necklace or chain and wear around their neck) so that the camera lens is facing in their view direction. The camera includes a 180° FOV that allows the camera to capture almost everything that the user is currently seeing. The user can start recording by simply tapping the surface of the device or pressing a button or speaking a command. No additional set-up is required. A multimedia data stream (e.g., video with audio) is recorded that captures the special moments of the birthday (e.g., blowing out the candles). This "context data" is sent to cloud computing platform 102 in real-time through a wireless network (e.g., WiFi, cellular). In an embodiment, the context data is stored on the wearable multimedia device so that it can be uploaded at a later time. In another embodiment, the user can transfer the context data to another device (e.g., personal computer hard drive, smartphone, tablet computer, thumb drive) and upload the context data to cloud computing platform 102 at a later time using an application.

In an embodiment, the context data is processed by one or more applications of an application ecosystem hosted and managed by cloud computing platform 102. Applications can be accessed through their individual application programming interfaces (APIs). A custom distributed streaming pipeline is created by cloud computing platform 102 to process the context data based on one or more of the data type, data quantity, data quality, user preferences, templates and/or any other information to generate a desired presentation based on user preferences. In an embodiment, machine learning technology can be used to automatically select suitable applications to include in the data processing pipeline with or without user preferences. For example, historical user context data stored in a database (e.g., NoSQL database) can be used to determine user preferences for data processing using any suitable machine learning technology (e.g., deep learning or convolutional neural networks).

In an embodiment, the application ecosystem can include third party platforms 105 that process context data. Secure sessions are set-up between cloud computing platform 102 and third party platforms 105 to send/receive context data. This design allows third party app providers to control access to their application and to provide updates. In other embodiments, the applications are run on servers of cloud computing platform 102 and updates are sent to cloud computing platform 102. In the latter embodiment, app developers 104 can use an API provided by cloud computing platform 102 to upload and update applications to be included in the application ecosystem.

Example Data Processing System

Figure 2:
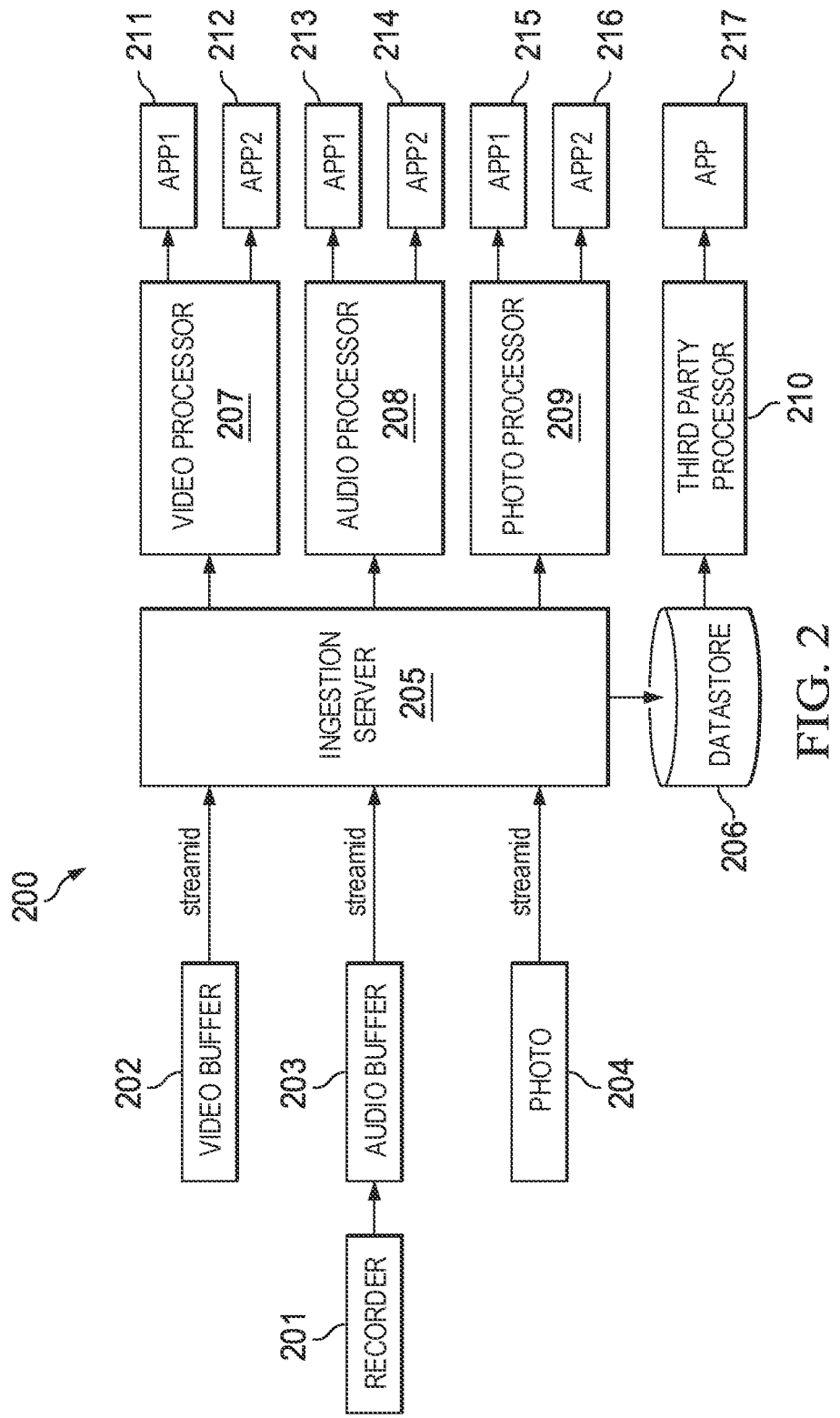
FIG. 2 is a block diagram of a data processing system implemented by the cloud computing platform of FIG. 1, according to an embodiment.

FIG. 2 is a block diagram of a data processing system implemented by the cloud computing platform of FIG. 1, according to an embodiment. Data processing system 200 includes recorder 201, video buffer 202, audio buffer 203, photo buffer 204, ingestion server 205, data store 206, video processor 207, audio processor 208, photo processor 209 and third party processor 210.

A recorder 201 (e.g., a software application) running on a wearable multimedia device records video, audio and photo data ("context data") captured by a camera and audio subsystem, and stores the data in buffers 202, 203, 204, respectively. This context data is then sent (e.g., using wireless OTA technology) to ingestion server 205 of cloud computing platform 102. In an embodiment, the data can be sent in separate data streams each with a unique stream identifier (streamid). The streams are discrete pieces of data that may contain the following example attributes: location (e.g., latitude, longitude), user, audio data, video stream of varying duration and N number of photos. A stream can have a duration of 1 to MAXSTREAM_LEN seconds, where in this example MAXSTREAM_LEN=20 seconds.

Ingestion server 205 ingests the streams and creates a stream record in data store 206 to store the results of processors 207-209. In an embodiment, the audio stream is processed first and is used to determine the other streams that are needed. Ingestion server 205 sends the streams to the appropriate processor 207-209 based on streamid. For example, the video stream is sent to video processor 207, the audio stream is sent to audio processor 208 and the photo stream is sent to photo processor 209. In an embodiment, at least a portion of data collected from the wearable multimedia device (e.g., image data) is processed into metadata and encrypted so that it can be further processed by a given application and sent back to the wearable multimedia device or other device.

Processors 207-209 can run proprietary or third party applications as previously described. For example, video processor 207 can be a video processing server that sends raw video data stored in video buffer 202 to a set of one or more image processing/editing applications 211, 212 based on user preferences or other information. Processor 207 sends requests to applications 211, 212, and returns the results to ingestion server 205. In an embodiment, third party processor 210 can process one or more of the streams using its own processor and application. In another example, audio processor 208 can be an audio processing server that sends speech data stored in audio buffer 203 to a speech-to-text converter application 213.

Example Scene Identification Application

Figure 3:
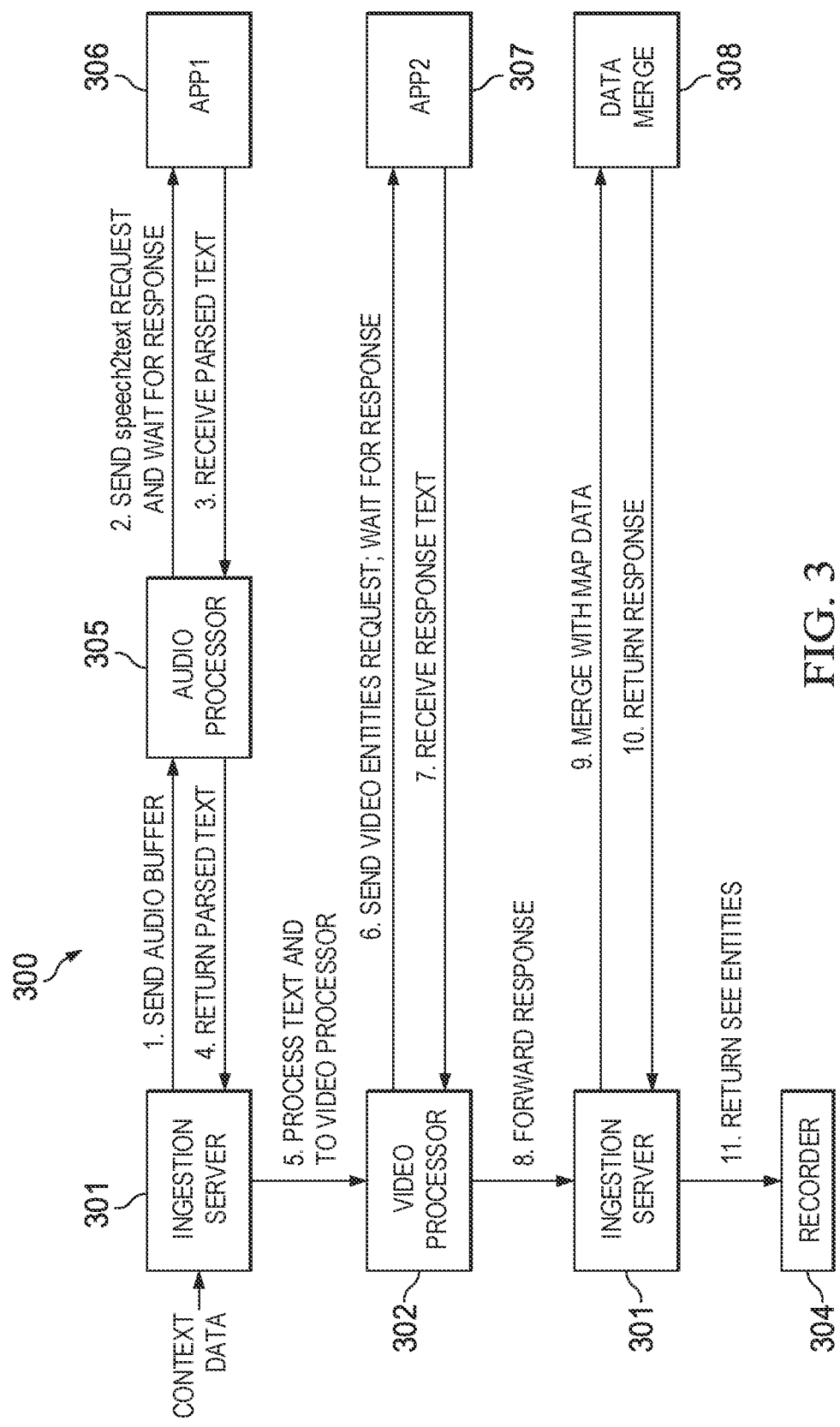
FIG. 3 is a block diagram of a data processing pipeline for processing a context data stream, according to an embodiment.

FIG. 3 is a block diagram of a data processing pipeline for processing a context data stream, according to an embodiment. In this embodiment, data processing pipeline 300 is created and configured to determine what the user is seeing based on the context data captured by a wearable multimedia device worn by the user. Ingestion server 301 receives an audio stream (e.g., including user commentary) from audio buffer 203 of wearable multimedia device and sends the audio stream to audio processor 305. Audio processor 305 sends the audio stream to app 306 which performs speech-to-text conversion and returns parsed text to audio processor 305. Audio processor 305 returns the parsed text to ingestion server 301.

Video processor 302 receives the parsed text from ingestion server 301 and sends a request to video processing app 307. Video processing app 307 identifies objects in the video scene and uses the parsed text to label the objects. Video processing app 307 sends a response describing the scene (e.g., labeled objects) to video processor 302. Video processor then forwards the response to ingestion server 301. Ingestion server 301 sends the response to data merge process 308, which merges the response with the user's location, orientation and map data. Data merge process 308 returns a response with a scene description to recorder 304 on the wearable multimedia device. For example, the response can include text describing the scene as the child's birthday party, including a map location and a description of objects in the scene (e.g., identify people in the scene). Recorder 304 associates the scene description with the multimedia data (e.g., using a streamid) stored on the wearable multimedia device. When the user recalls the data, the data is enriched with the scene description.

In an embodiment, data merge process 308 may use more than just location and map data. There can also be a notion of ontology. For example, the facial features of the user's Dad captured in an image can be recognized by the cloud computing platform, and be returned as "Dad" rather than the user's name, and an address such as "555 Main Street, San Francisco, Calif." can be returned as "Home." The ontology can be specific to the user and can grow and learn from the user's input.

Example Transportation Application

Figure 4:
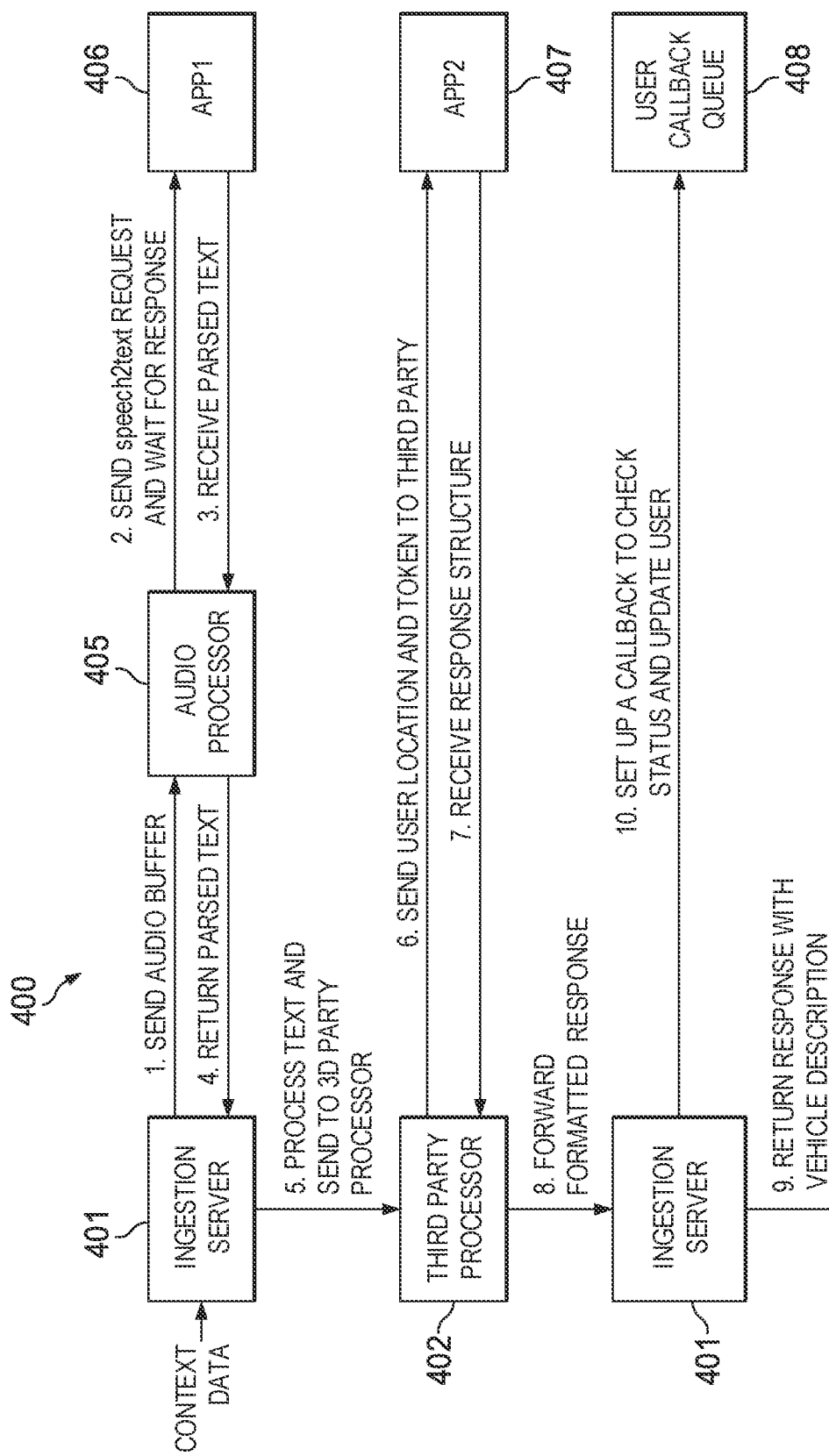
FIG. 4 is a block diagram of another data processing for processing a context data stream for a transportation application, according to an embodiment.

FIG. 4 is a block diagram of another data processing for processing a context data stream for a transportation application, according to an embodiment. In this embodiment, data processing pipeline 400 is created to call a transportation company (e.g., Uber®, Lyft®) to get a ride home. Context data from a wearable multimedia device is received by ingestion server 401 and an audio stream from an audio buffer 203 is sent to audio processor 405. Audio processor 405 sends the audio stream to app 406, which converts the speech to text. The parsed text is returned to audio processor 405, which returns the parsed text to ingestion server 401 (e.g., a user speech request for transportation). The processed text is sent to third party processor 402. Third party processor 402 sends the user location and a token to a third party application 407 (e.g., Uber® or Lyft™®) application). In an embodiment, the token is an API and authorization token used to broker a request on behalf of the user. Application 407 returns a response data structure to third party processor 402, which is forwarded to ingestion server 401. Ingestion server 401 checks the ride arrival status (e.g., ETA) in the response data structure and sets up a callback to the user in user callback queue 408. Ingestion server 401 returns a response with a vehicle description to recorder 404, which can be spoken to the user by a digital assistant through a loudspeaker on the wearable multimedia device, or through the user's headphones or earbuds via a wired or wireless connection.

FIG. 5 illustrates data objects used by the data processing system of FIG. 2, according to an embodiment. The data objects are part of software component infrastructure instantiated on the cloud computing platform. A "streams" object includes the data streamid, deviceid, start, end, lat, lon, attributes and entities. "Streamid" identifies the stream (e.g., video, audio, photo), "deviceid" identifies the wearable multimedia device (e.g., a mobile device ID), "start" is the start time of the context data stream, "end" is the end time of the context data stream, "lat" is the latitude of the wearable multimedia device, "lon" is the longitude of the wearable multimedia device, "attributes" include, for example, birthday, facial points, skin tone, audio characteristics, address, phone number, etc., and "entities" make up an ontology. For example, the name "John Do" would be mapped to "Dad" or "Brother" depending on the user.

A "Users" object includes the data userid, deviceid, email, fname and lname. Userid identifies the user with a unique identifier, deviceid identifies the wearable device with a unique identifier, email is the user's registered email address, fname is the user's first name and lname is the user's last name. A "Userdevices" object includes the data userid and deviceid. A "devices" object includes the data deviceid, started, state, modified and created. In an embodiment, deviceid is a unique identifier for the device (e.g., distinct from a MAC address). Started is when the device was first started. State is on/off/sleep. Modified is the last modified date, which reflects the last state change or operating system (OS) change. Created is the first time the device was turned on.

A "ProcessingResults" object includes the data streamid, ai, result, callback, duration an accuracy. In an embodiment, streamid is each user stream as a Universally Unique Identifier (UUID). For example, a stream that was started from 8:00 AM to 10:00 AM will have id:15h158dhb4 and a stream that starts from 10:15 AM to 10:18 AM will have a UUID that was contacted for this stream. AI is the identifier for the platform application that was contacted for this stream. Result is the data sent from the platform application. Callback is the callback that was used (versions can change hence the callback is tracked in case the platform needs to replay the request). Accuracy is the score for how accurate the result set is. In an embodiment, processing results can be used for multiple tasks, such as 1) to inform the merge server of the full set of results, 2) determine the fastest AI so that user experience can be enhanced, and 3) determine the most accurate ai. Depending on the use case, one may favor speed over accuracy or vice versa.

An "Entities" object includes the data entityID, userID, entityName, entityType and entityAttribute. EntityID is a UUID for the entity and an entity having multiple entries where the entityID references the one entity. For example, "Barack Obama" would have an entityID of 144, which could be linked in an associations table to POTUS44 or "Barack Hussein Obama" or "President Obama." UserID identifies the user that the entity record was made for. EntityName is the name that the userID would call the entity. For example, Malia Obama's entityName for entityID 144 could be "Dad" or "Daddy." EntityType is a person, place or thing. EntityAttribute is an array of attributes about the entity that are specific to the userID's understanding of that entity. This maps entities together so that when, for example, Malia makes the speech query: "Can you see Dad?", the cloud computing platform can translate the query to Barack Hussein Obama and use that in brokering requests to third parties or looking up information in the system.

Example Processes

Figure 6:
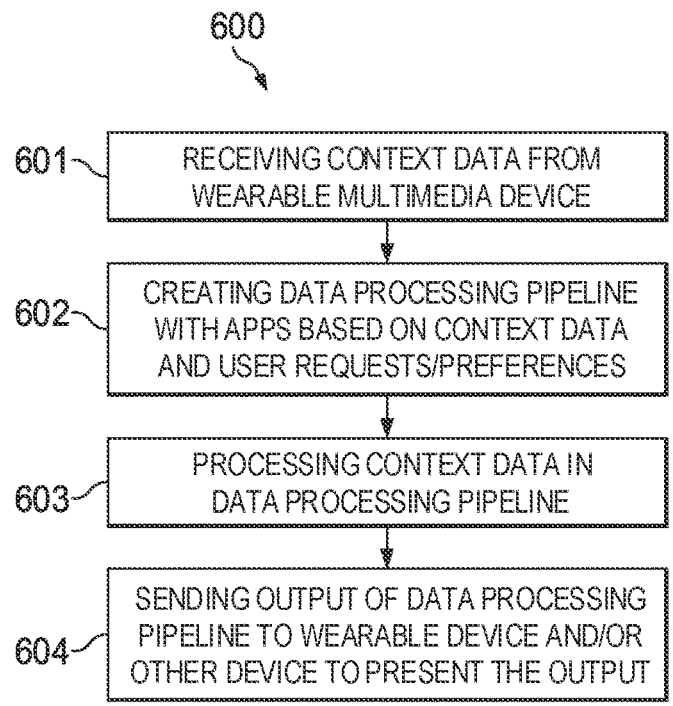
FIG. 6 is a flow diagram of a data pipeline process, according to an embodiment.

FIG. 6 is flow diagram of a data pipeline process, according to an embodiment. Process 600 can be implemented using wearable multimedia devices 101 and cloud computing platform 102 described in reference to FIGS. 1-5.

Process 600 can begin by receiving context data from a wearable multimedia device (601). For example, the context data can include video, audio and still images captured by a camera and audio subsystem of the wearable multimedia device.

Process 600 can continue by creating (e.g., instantiating) a data processing pipeline with applications based on the context data and user requests/preferences (602). For example, based on user requests or preferences, and also based on the data type (e.g., audio, video, photo), one or more applications can be logically connected to form a data processing pipeline to process the context data into a presentation to be playback on the wearable multimedia device or another device.

Process 600 can continue by processing the context data in the data processing pipeline (603). For example, speech from user commentary during a moment or transaction can be converted into text, which is then used to label objects in a video clip.

Process 600 can continue by sending the output of the data processing pipeline to the wearable multimedia device and/or other playback device (604).

Example Cloud Computing Platform Architecture

Figure 7:
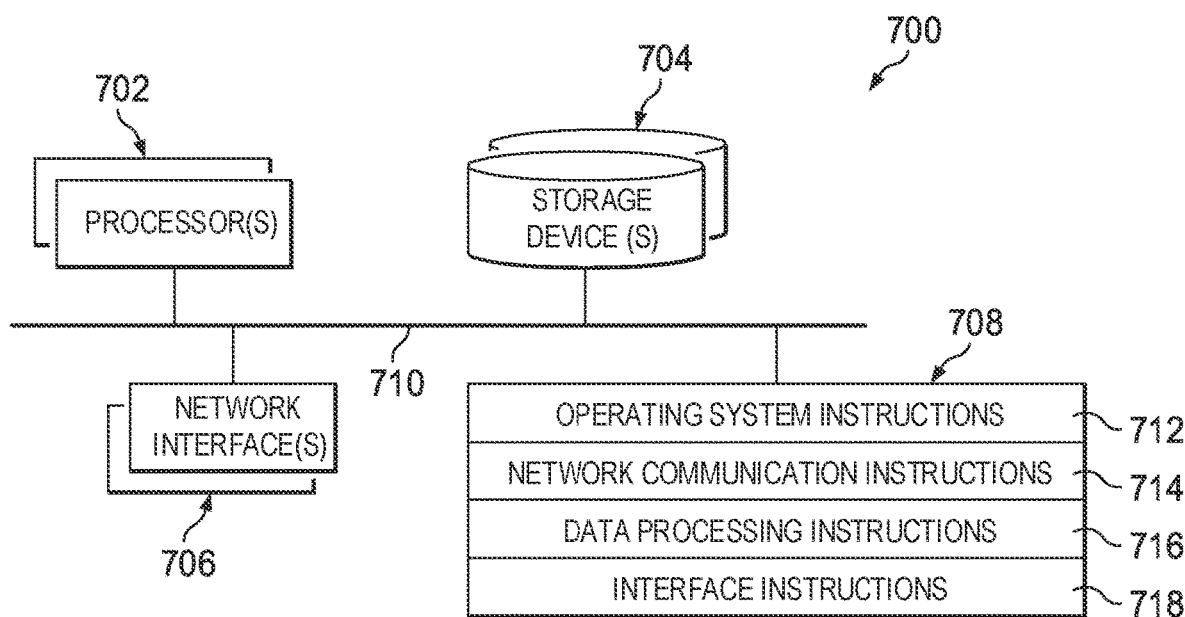
FIG. 7 is an architecture for the cloud computing platform, according to an embodiment.

FIG. 7 is an example architecture 700 for cloud computing platform 102 described in reference to FIGS. 1-6, according to an embodiment. Other architectures are possible, including architectures with more or fewer components. In some implementations, architecture 700 includes one or more processor(s) 702 (e.g., dual-core Intel® Xeon® Processors), one or more network interface(s) 706, one or more storage device(s) 704 (e.g., hard disk, optical disk, flash memory) and one or more computer-readable medium(s) 708 (e.g., hard disk, optical disk, flash memory, etc.). These components can exchange communications and data over one or more communication channel(s) 710 (e.g., buses), which can utilize various hardware and software for facilitating the transfer of data and control signals between components.

The term "computer-readable medium" refers to any medium that participates in providing instructions to processor(s) 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium(s) 708 can further include operating system 712 (e.g., Mac OS® server, Windows® NT server, Linux Server), network communication module 714, interface instructions 716 and data processing instructions 718.

Operating system 712 can be multi-user, multiprocessing, multitasking, multithreading, real time, etc. Operating system 712 performs basic tasks, including but not limited to: recognizing input from and providing output to devices 702, 704, 706 and 708; keeping track and managing files and directories on computer-readable medium(s) 708 (e.g., memory or a storage device); controlling peripheral devices; and managing traffic on the one or more communication channel(s) 710. Network communications module 714 includes various components for establishing and maintaining network connections (e.g., software for implementing communication protocols, such as TCP/IP, HTTP, etc.) and for creating a distributed streaming platform using, for example, Apache Kafka™. Data processing instructions 716 include server-side or backend software for implementing the server-side operations, as described in reference to FIGS. 1-6. Interface instructions 718 includes software for implementing a web server and/or portal for sending and receiving data to and from wearable multimedia devices 101, third party application developers 104 and third party platforms 105, as described in reference to FIG. 1.

Architecture 700 can be included in any computer device, including one or more server computers in a local or distributed network each having one or more processing cores. Architecture 700 can be implemented in a parallel processing or peer-to-peer infrastructure or on a single device with one or more processors. Software can include multiple software components or can be a single body of code.

Example Wearable Multimedia Device Architecture

Figure 8:
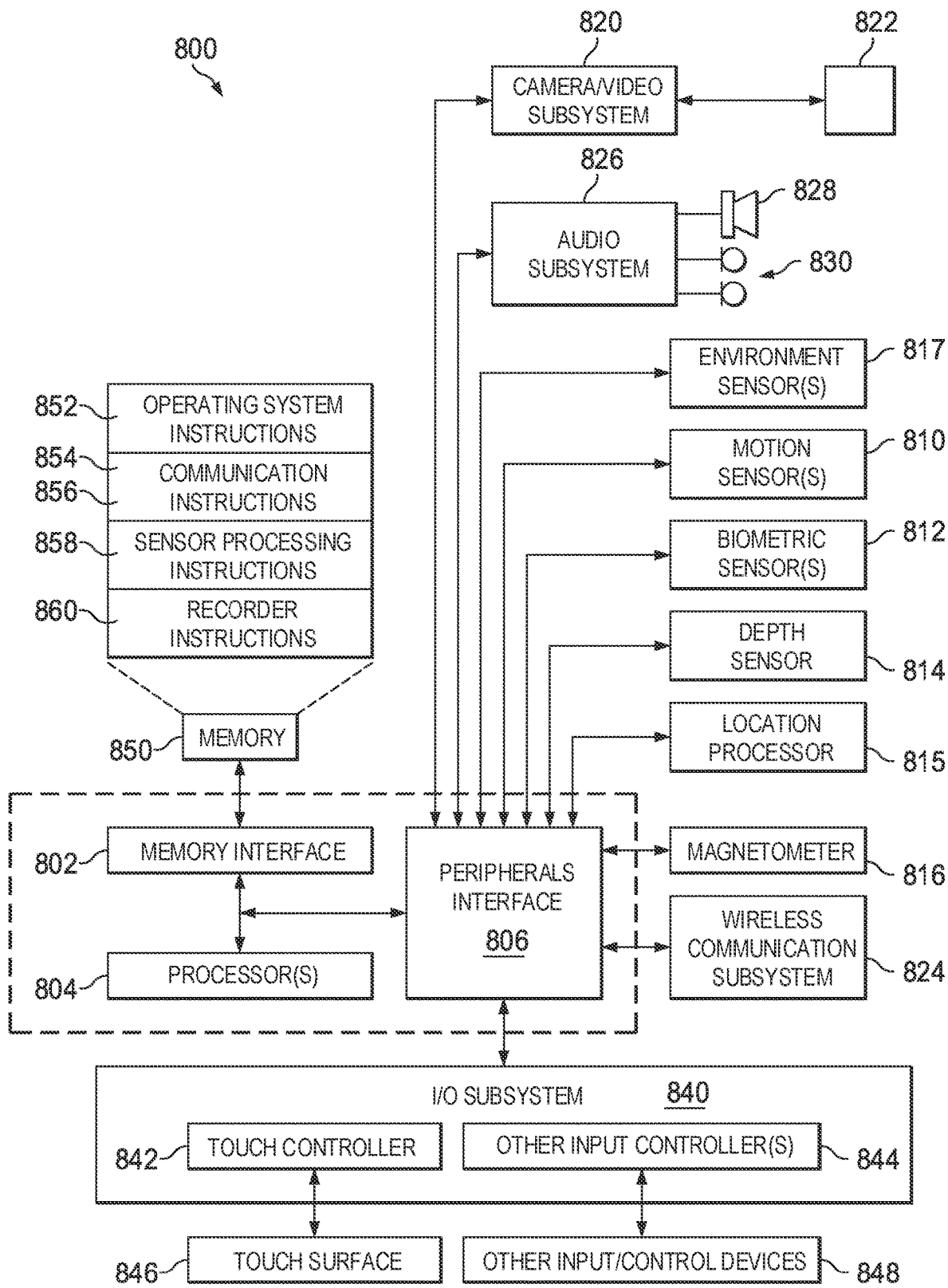
FIG. 8 is an architecture for the wearable multimedia device, according to an embodiment.

FIG. 8 is a block diagram of example architecture 800 for a wearable multimedia device implementing the features and processes described in reference to FIGS. 1-6. Architecture 800 may include memory interface 802, data processor(s), image processor(s) or central processing unit(s) 804, and peripherals interface 806. Memory interface 802, processor(s) 804 or peripherals interface 806 may be separate components or may be integrated in one or more integrated circuits. One or more communication buses or signal lines may couple the various components.

Sensors, devices, and subsystems may be coupled to peripherals interface 806 to facilitate multiple functions. For example, motion sensor(s) 810, biometric sensor(s) 812, and depth sensor(s) 814 may be coupled to peripherals interface 806 to facilitate motion, orientation, biometric, and depth detection functions. In some implementations, motion sensor(s) 810 (e.g., an accelerometer, rate gyroscope) may be utilized to detect movement and orientation of the wearable multimedia device.

Other sensors may also be connected to peripherals interface 806, such as environmental sensor(s) (e.g., temperature sensor, barometer, ambient light) to facilitate environment sensing functions. For example, a biometric sensor can detect fingerprints, face recognition, heart rate and other fitness parameters. In an embodiment, a haptic motor (not shown) can be coupled to the peripheral interface, which can provide vibration patterns as haptic feedback to the user.

Location processor 815 (e.g., GNSS receiver chip) may be connected to peripherals interface 806 to provide georeferencing. Electronic magnetometer 816 (e.g., an integrated circuit chip) may also be connected to peripherals interface 806 to provide data that may be used to determine the direction of magnetic North. Thus, electronic magnetometer 816 may be used by an electronic compass application.

Camera subsystem 820 and an optical sensor 822, e.g., a charged coupled device (CCD) or a complementary metal-oxide semiconductor (CMOS) optical sensor, may be utilized to facilitate camera functions, such as recording photographs and video clips. In an embodiment, the camera has a 180° FOV and OIS. The depth sensor can include an infrared emitter that projects dots in a known pattern onto an object/subject. The dots are then photographed by a dedicated infrared camera and analyzed to determine depth data. In an embodiment, a time-of-flight (TOF) camera can be used to resolve distance based on the known speed of light and measuring the time-of-flight of a light signal between the camera and an object/subject for each point of the image.

Communication functions may be facilitated through one or more communication subsystems 824. Communication subsystem(s) 824 may include one or more wireless communication subsystems. Wireless communication subsystems 824 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data (e.g., a projector).

The specific design and implementation of the communication subsystem 824 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., WiFi, WiMax, ZigBee™), 3G, 4G, 4G LTE, code division multiple access (CDMA) networks, near field communication (NFC), Wi-Fi Direct and a Bluetooth™ network. Wireless communication subsystems 824 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 826 may be coupled to a speaker 828 and one or more microphones 830 to facilitate voice-enabled functions, such as voice recognition, voice replication, digital recording, telephony functions and beamforming.

I/O subsystem 840 may include touch controller 842 and/or another input controller(s) 844. Touch controller 842 may be coupled to a touch surface 846. Touch surface 846 and touch controller 842 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 846. In one implementation, touch surface 846 may display virtual or soft buttons, which may be used as an input/output device by the user.

Other input controller(s) 844 may be coupled to other input/control devices 848, such as one or more buttons, rocker switches, thumb-wheel, infrared port, USB port, and/or a pointer device such as a stylus. The one or more buttons (not shown) may include an up/down button for volume control of speaker 828 and/or microphone 830.

Further, a projector subsystem 832 may be connected to peripherals interface 806 to present information visually to a user in the form of projected light. For example, the projector subsystem 832 can project light onto a surface according to a particular spatial and/or temporal pattern, such that the user perceives text, images, videos, colors, patterns, and/or any other graphical information on the surface. In some implementations, the projector subsystem 832 can project light onto a surface of the user's body, such as the user's hand or palm. In some implementations, the projector subsystem 832 can project light onto a surface other than the user's body, such as a wall, a table, a desk, or any other object. The projector subsystem 832 is described in greater detail with reference to FIG. 9.

In some implementations, the projector subsystem 832 project light onto a surface to provide an interactive VI for a user. For example, the projector subsystem 832 can project light onto the surface, such that the user perceives one or more interactive user interface elements (e.g., selectable buttons, dials, switches, boxes, images, videos, text, icons, etc.). Further, the user can interact with the VI by performing one or more gestures with respect to the VI and the user interface elements. For example, the user can perform a pointing gesture, a tapping gesture, a swiping gesture, a waving gesture, or any other gesture using her hands and/or fingers. In some implementations, a user can perform a gesture using a single hand at a time (e.g., using the hand upon which the VI is projected or her other hand). In some implementations, a user can perform a gesture using two hands concurrently. The wearable multimedia device can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804). Example VIs are described in further detail below.

In some implementations, the wearable multimedia device 101 can detect the type of surface that is positioned in the projection area of the projector subsystem 832 (e.g., using the camera/video subsystems 820, environment sensor(s) 817, depth sensor(s) 814, etc.), and adjust one or more characteristics of the VI based on the type of surface that is detected. This can be beneficial, for example, in improving the legibility and usability of the VI in different operating environments and/or use cases.

As an example, the wearable multimedia device 101 can detect that a surface of the user's hand (e.g., the user's palm)

is positioned in the projection area of the projector subsystem. As the surface area of the user's hand may be constrained (e.g., compared to a surface of a desk or wall), the wearable multimedia device 101 can reduce the overall size of the VI, such that the VI can be presented in its entirety on the user hand. Further, the wearable multimedia device 101 can adjust the size, colors, shapes, spacing, complexity, and/or other visual characteristics of the use interface elements of the VI, such that the user can readily interpret and/or interact with each of the user interface elements.

As an example, the wearable multimedia device 101 can detect that a surface of a wall, table, desk, etc. is positioned in the projection area of the projector subsystem. As the surface area of a wall, table, desk, etc. may be larger (e.g., compared to a surface of the user's hand), the wearable multimedia device 101 can increase the overall size of the VI to make better use of the larger projection surface. Further, the wearable multimedia device 101 can adjust the size, colors, shapes, spacing, complexity, and/or other visual characteristics of the use interface elements of the VI, such that the user can readily interpret and/or interact with each of the user interface elements.

In some implementations, device 800 plays back to a user recorded audio and/or video files (including spatial audio), such as MP3, AAC, spatial audio and MPEG video files. In some implementations, device 800 may include the functionality of an MP3 player and may include a pin connector or other port for tethering to other devices. Other input/output and control devices may be used. In an embodiment, device 800 may include an audio processing unit for streaming audio to an accessory device over a direct or indirect communication link.

Memory interface 802 may be coupled to memory 850. Memory 850 may include high-speed random access memory or non-volatile memory, such as one or more magnetic disk storage devices, one or more optical storage devices, or flash memory (e.g., NAND, NOR). Memory 850 may store operating system 852, such as Darwin, RTXC, LINUX, UNIX, OS X, iOS, WINDOWS, or an embedded operating system such as VxWorks. Operating system 852 may include instructions for handling basic system services and for performing hardware dependent tasks. In some implementations, operating system 852 may include a kernel (e.g., UNIX kernel).

Memory 850 may also store communication instructions 854 to facilitate communicating with one or more additional devices, one or more computers or servers, including peer-to-peer communications with wireless accessory devices, as described in reference to FIGS. 1-6. Communication instructions 854 may also be used to select an operational mode or communication medium for use by the device, based on a geographic location of the device.

Memory 850 may include sensor processing instructions 858 to facilitate sensor-related processing and functions and recorder instructions 860 to facilitate recording functions, as described in reference to FIGS. 1-6. Other instructions can include GNSS/Navigation instructions to facilitate GNSS and navigation-related processes, camera instructions to facilitate camera-related processes and user interface instructions to facilitate user interface processing, including a touch model for interpreting touch inputs.

Each of the above identified instructions and applications may correspond to a set of instructions for performing one or more functions described above. These instructions need not be implemented as separate software programs, procedures, or modules. Memory 850 may include additional instructions or fewer instructions. Furthermore, various functions of the device may be implemented in hardware and/or in software, including in one or more signal processing and/or application specific integrated circuits (ASICs).

Figure 9:
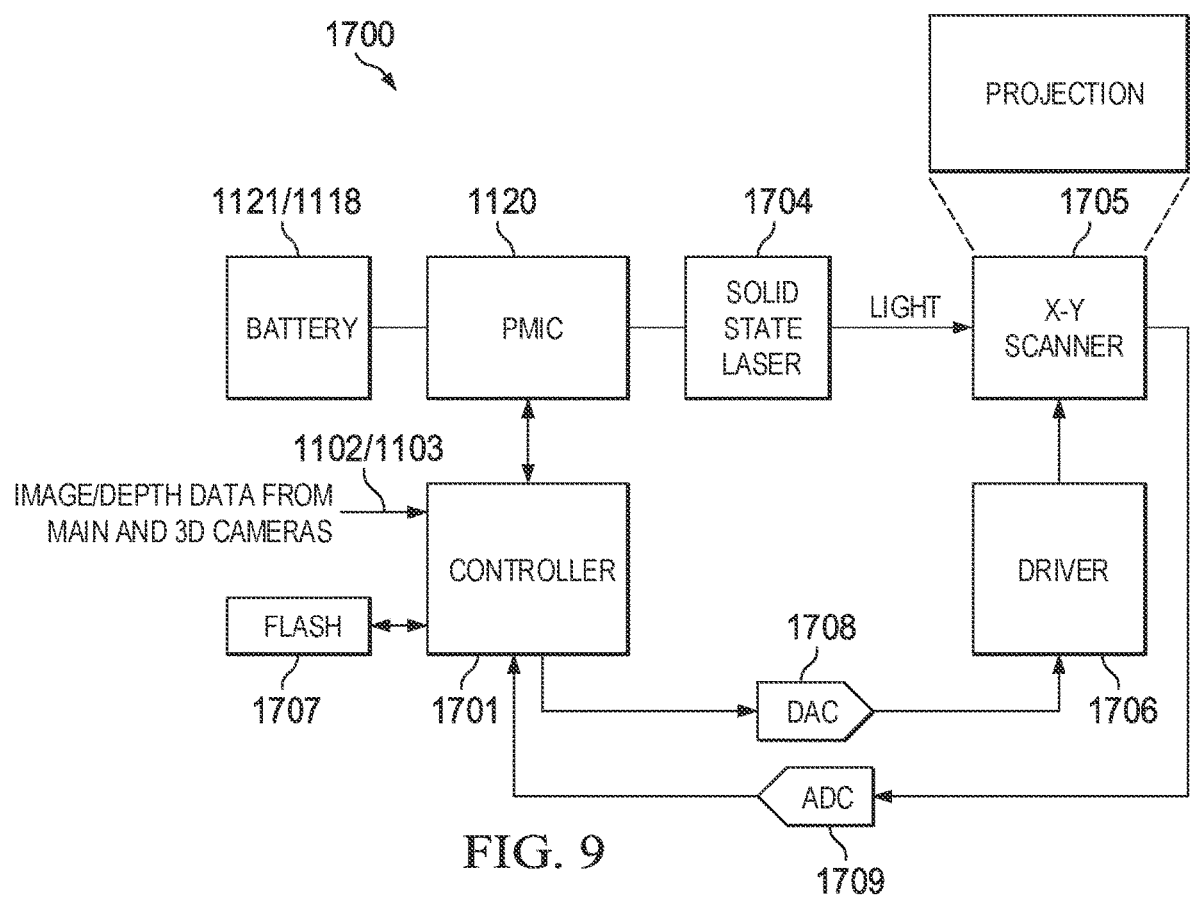
FIG. 9 is a system block diagram of a projector architecture, according to an embodiment.

FIG. 9 is a system block diagram of the projector subsystem 832, according to an embodiment. The projector subsystem 832 scans a pixel in two dimensions, images a 2D array of pixels, or mixes imaging and scanning. Scanning projectors directly utilize the narrow divergence of laser beams, and two-dimensional (2D) scanning to "paint" an image pixel by pixel. In some embodiments, separate scanners are used for the horizontal and vertical scanning directions. In other embodiments, a single biaxial scanner is used. The specific beam trajectory also varies depending on the type of scanner used.

In the example shown, the projector subsystem 832 is a scanning pico-projector that includes controller 901, battery 902, power management chip (PMIC) 903, solid state laser 904, X-Y scanner 905, driver 906, memory 907, digital-to-analog converter (DAC) 908 and analog-to-digital converter (ADC) 909.

Controller 901 provides control signals to X-Y scanner 905. X-Y scanner 905 uses moveable mirrors to steer the laser beam generated by solid state laser 904 in two dimensions in response to the control signals. X-Y scanner 95 includes one or more micro-electromechanical (MEMS) micromirrors that have controllable tilt angles in one or two dimensions. Driver 906 includes a power amplifier and other electronic circuitry (e.g., filters, switches) to provide the control signals (e.g., voltages or currents) to X-Y scanner 905. Memory 907 stores various data used by the projector including laser patterns for text and images to be projected. DAC 908 and ADC 909 provide data conversion between digital and analog domains. PMIC 903 manages the power and duty cycle of solid state laser 1904, including turning on and shutting of solid state laser 904 and adjusting the amount of power supplied to solid state laser 904. Solid state laser 904 can be, for example, a vertical-cavity surface-emitting laser (VCSEL).

In an embodiment, controller 901 uses image data from the camera/video subsystem 820 and/or depth data from the depth sensor(s) 814 to recognize and track user hand and/or finger positions on the laser projection, such that user input is received by the wearable multimedia device 101 using the laser projection as an input interface.

In another embodiment, the projector subsystem 832 uses a vector-graphic projection display and low-powered fixed MEMS micromirrors to conserve power. Because the projector subsystem 832 includes a depth sensor, the projected area can be masked when necessary to prevent projecting on a finger/hand interacting with the laser projected image. In an embodiment, the depth sensor can also track gestures to control the input on another devices (e.g., swiping through images on a TV screen, interacting with computers, smart speakers, etc.).

In other embodiments, Liquid Crystal on Silicon (LCoS or LCOS), Digital Light Processing (DLP) or Liquid Chrystal Display (LCD) digital projection technology can be used instead of a pico-projector.

Example Techniques for Composing Electronic Messages

In general, the wearable multimedia device 101 can capture multimedia data of spontaneous moments and transactions with minimal interaction by the user. Further, the wearable multimedia device 101 can automatically edit and format the multimedia data on a cloud computing platform based on user preferences, and make the multimedia data available to the user for replay on a variety of user playback devices. In some implementations, the data editing and/or processing can be performed by an ecosystem of applications that are proprietary and/or provided/licensed from third party developers. Further, the application ecosystem can provide various access points (e.g., a website, portal, API) that allow the third party developers to upload, verify and update their applications. Further, the cloud computing platform can automatically build a custom processing pipeline for each multimedia data stream using one or more of the ecosystem applications, user preferences and other information (e.g., the type or format of the data, the quantity and quality of the data).

Additionally, the wearable multimedia device 101 can include one or more cameras and/or depth sensor configured to detect objects and/or gestures performed by the user (e.g., using the user's hands), and perform or infer various actions based on the detections. As an example, based on the detections, the wearable multimedia device can label objects in camera images, control the operation of the wearable multimedia device, and/or control the operation of other devices communicatively coupled to the wearable multimedia device. Example cameras and/or depth sensors include the camera/video subsystem 820 and biometric sensor(s) 812, as described with reference to FIG. 8.

Further, in some implementations, the wearable multimedia device does not include a display, thereby allowing the user to continue interacting with friends, family, and co-workers without being immersed in a display. As such, the wearable multimedia device takes a different technical approach than, for example, smart goggles or glasses for augmented reality (AR) and virtual reality (VR), where the user is further detached from the real-world environment. To facilitate collaboration with others and to compensate for no display, the wearable multimedia computer can include a laser projection system (e.g., a projector subsystem 832, as described with reference to FIG. 8) that projects a laser projection onto any surface, including tables, walls and even the user's palm. The laser projection can label objects, provide text or instructions related to the objects, and provide a virtual interface (VI) that allows the user to compose messages, control other devices, or simply share and discuss content with others.

For instance, the wearable multimedia device 101 can include a projector subsystem 832 configured to present information visually to a user in the form of projected light. As an example, the projector subsystem 832 can project light onto a surface (e.g., a surface of a user's hand, such as the user's palm) according to a particular spatial and/or temporal pattern, such that the user perceives a VI with one or more user interface elements. Further, the user can perform gestures to interact with the VI.

Further, the user can perform gestures to interact with the VI. For instance, the user can perform one or more gestures directed at one or more of the user interface elements. As examples, the user can point to a user interface element, touch or tap a user interface element using her finger (e.g., a single time, or multiple times in a sequence), perform a swiping motion along a user interface element using her finger, wave at a user interface element using her hand, hover over the user interface element, or perform any other hand or finger gesture. In some implementations, a user can perform a gesture using a single hand at a time (e.g., using the hand upon which the VI is projected or her other hand). In some implementations, a user can perform a gesture using two hands concurrently. The wearable multimedia device 101 can detect the performed gestures using one or more sensors (e.g., the camera/video subsystems 820, environment sensor(s) 817, depth sensor(s) 814, etc.), identify one or more commands associated with those gestures, and execute the identified commands (e.g., using the processor(s) 804).

At least some of the user interface elements and/or commands can be used to control the operation of the wearable multimedia device 101. For example, at least some of the user interface elements and/or commands can be used to execute or control the generation of video and/or audio content, the viewing of content, the editing of content, the storing and transmission data, and/or any other operation described herein.

In some implementations, a wearable multimedia device 101 can present a VI that allows a user to compose and send a message to one or more other users. This VI may also be referred to as a message composition interface.

Figure 10:
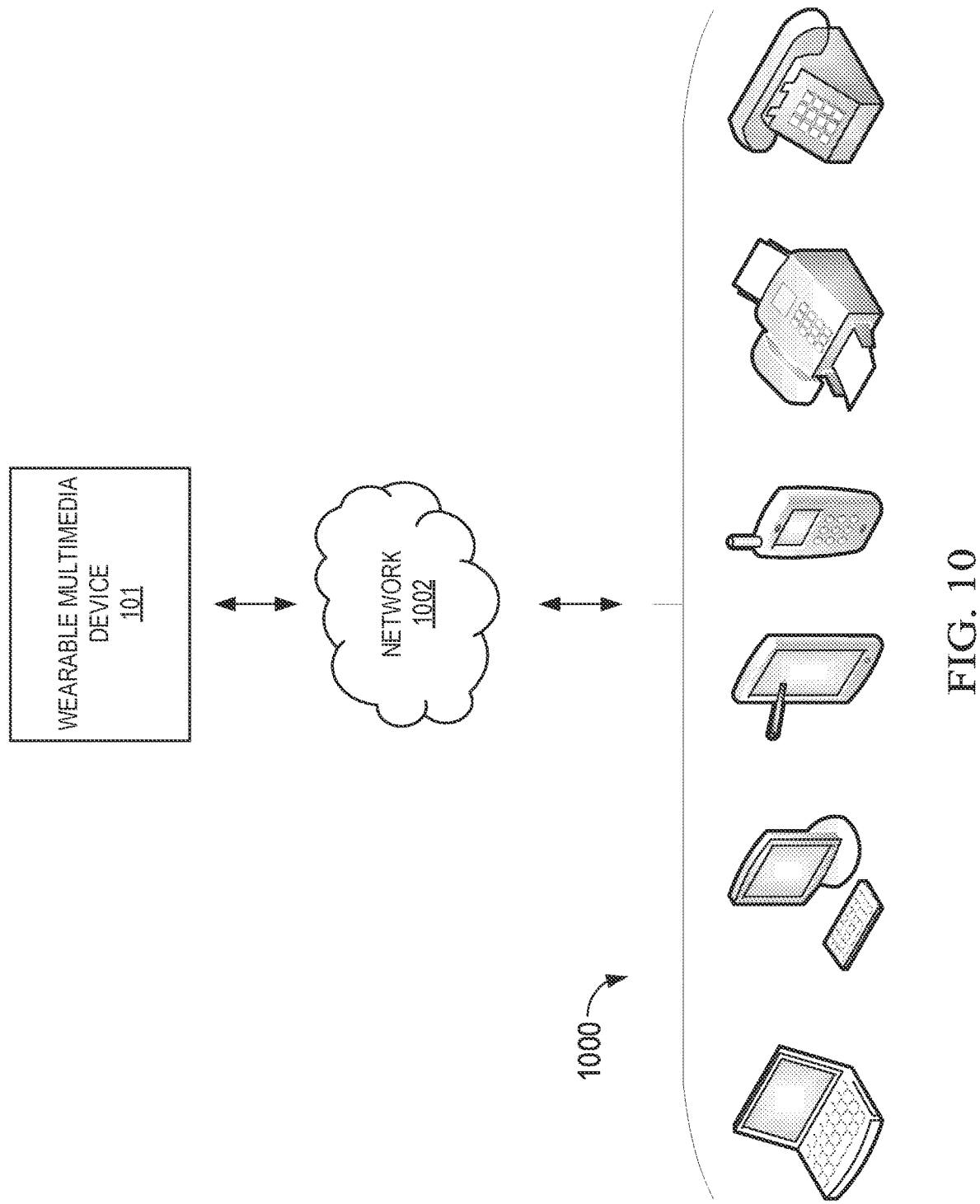
FIG. 10 is a diagram of a wearable multimedia device communicatively coupled to one or more other devices via a network.

As an illustrative example, referring to FIG. 10, a user can use the wearable multimedia device 101 to compose, transmit, and/or receive electronic messages. For instance, the wearable multimedia device 101 can compose an electronic message, and transmit the electronic message to one or more other electronic devices 1000 via a communications network 1002. Further, the wearable multimedia device 101 can receive one or more electronic messages transmitted by the electronic devices 1000 via the communications network 1002.

Example electronic messages include e-mails, text messages (e.g., Short Message Service (SMS) messages, Multimedia Messaging Service (MMS) messages, Rich Communication Services (RCS) messages, etc.), chat messages, or any other type of electronic communication including text, images, videos, audio, and/or other any other content. In some implementations, an electronic message can include multimedia content generated by the wearable multimedia device 101 or otherwise obtained by the wearable multimedia device 101 (e.g., as described with reference to FIG. 1-9).

The electronic devices 1000 can include any devices that are configured to transmit and/or receive data via a communications network 1002. Example electronic devices 1000 include client computing devices (e.g., desktop computers or notebook computers), server computing devices (e.g., server computers or cloud computing systems), mobile computing devices (e.g., cellular phones, smartphones, tablets, personal data assistants, notebook computers with networking capability), wearable computing devices (e.g., a smart phone or a headset), wearable multimedia devices (e.g., wearable multimedia devices similar to the wearable multimedia device 101), and other computing devices capable of transmitting and/or receive data.

Further, the communications network 1002 can be any network through which data can be transferred and shared. For example, the communications network 1002 can be a local area network (LAN) or a wide-area network (WAN), such as the Internet. The communications network 1002 can be implemented using various networking interfaces, for instance wireless networking interfaces (e.g., Wi-Fi, Bluetooth, or infrared) or wired networking interfaces (e.g., Ethernet or serial connection). The communications network 1002 also can include combinations of more than one network, and can be implemented using one or more networking interfaces. In some implementations, the communications network 1002 can be similar to the network 103 described with reference to FIG. 1.

Figure 11A:
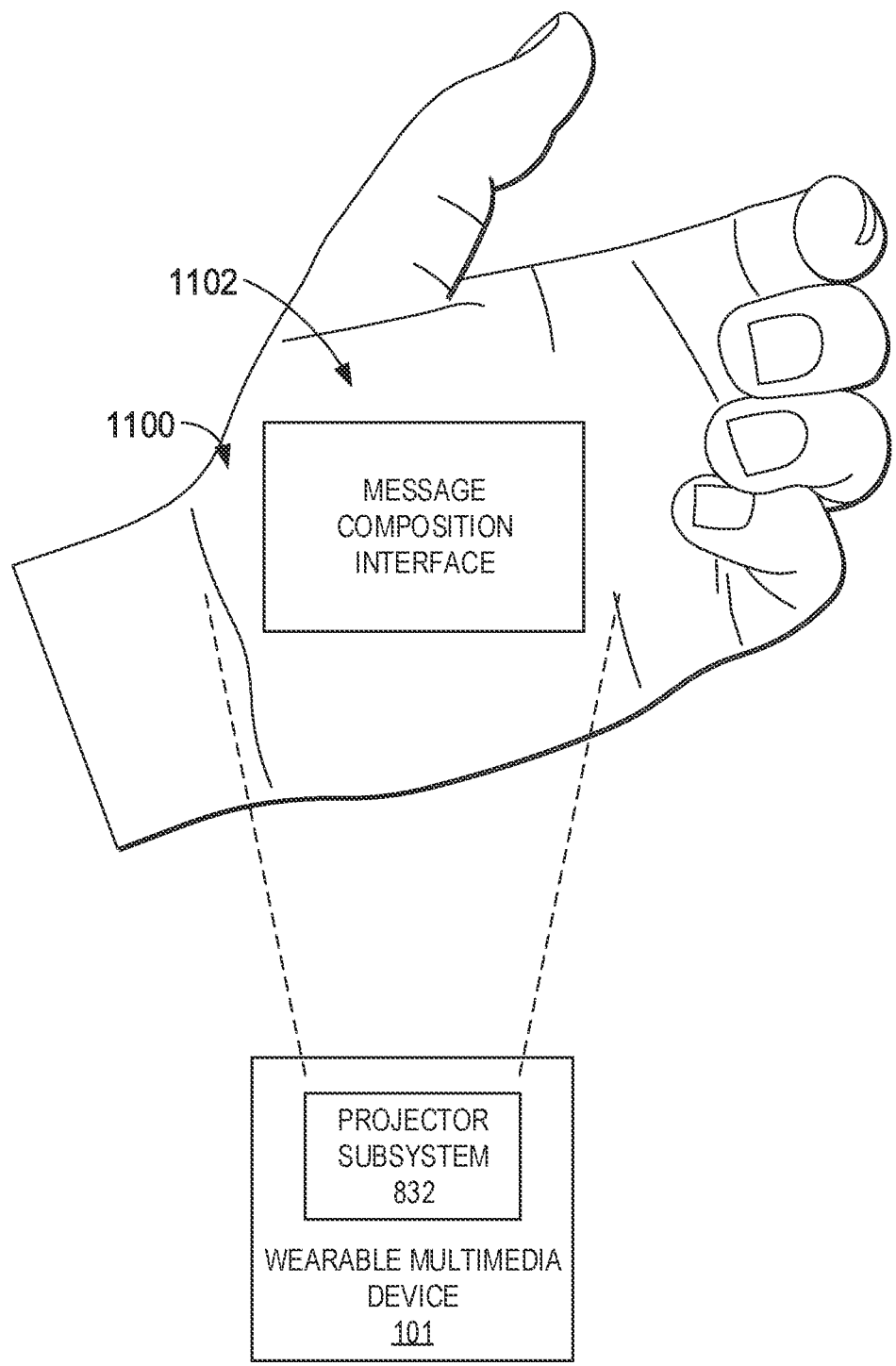
FIGS. 11A and 11B are diagrams of an example message composition interface.

As described above, the wearable multimedia device 101 can present a message composition interface that allows a user to compose and send a message to one or more other users. As an illustrative example, FIG. 11A shows a message composition interface 1100 projected by a projector subsystem 832 onto a user's palm 1102. The user can interact with the message composition interface 1100 to compose and send messages to one or more other users (also referred to herein as "recipients"). In some implementations, the message composition interface 1100 can be used to compose and transmit text messages, emails, chat messages, and/or any other type of electronic message.

In some implementations, the message composition interface 1100 can include a composition user interface (UI) element for receiving the recipient of the message, and text, images, video, and/or other content for inclusion in the message. Further, the message composition interface 1100 can present one or more selectable options, each corresponding to a different available application and/or service for sending the message. Using the composition UI element, the user can initially specify the recipient of the message and provide text, images, video, and/or other content for inclusion in the message. Subsequently, the user can select a particular application and/or service for sending the message.

Figure 11B:
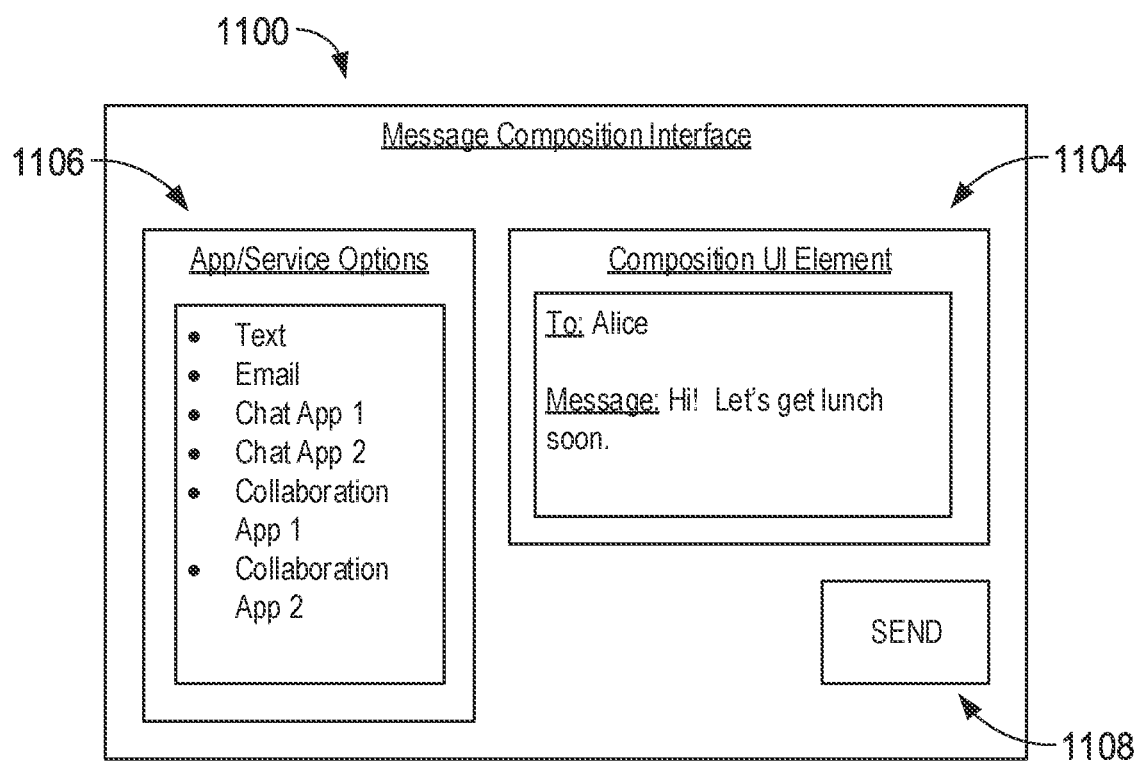

An example message composition interface 1100 is shown in greater detail in FIG. 11B. The message composition interface 1100 includes a first user interface (UI) element 1104 (also referred to as a composition UI element 1104), a second UI element 1106 (also referred to as an option selection UI element 1106), and a send button 1108.

The composition UI element 1104 is configured to present a working draft of a message. As an example, the composition UI element 1104 can indicate the recipient (or recipients) of the message. For instance, the composition UI element 1104 can indicate one or more names, email address, telephone numbers, user names, and/or other identifiers that are associated with the user (or users) who are to receive the message.

As another example, the composition UI element 1104 can indicate the contents of the message. For instance, the composition UI element 1104 can indicate text, images, videos, audio, or any other content for inclusion in the message.

Further, the composition UI element 1104 allows a user to edit the recipients and/or contents of the message. For example, the user can select the composition UI element, and provide user input specifying one or more recipients of the message, the contents of the message, and/or revisions or modifications to the recipients and/or contents. In some implementations, the user can provide user input via an external device, such as a keyboard, a mouse, and/or a touch sensitive display, wired or wirelessly coupled to the wearable multimedia device 101. In some implementations, the user can provide user input by performing one or more gestures that are detected and interpreted by the wearable multimedia device 101 (e.g., using the camera/video subsystem 820, depth sensor(s) 814, etc.). In some implementations, the user can provide user input through spoken commands that are detected and interpreted by the wearable multimedia device 101 (e.g., using the microphones 830 and a speech recognition engine).

The option selection UI element 1106 is configured to present one or more applications and/or services that can be selected by the user to transmit the message to the recipient (or recipients). In some implementations, the applications and/or services can include a text messaging application or service (e.g., an application or service that exchanges message using Short Message Service (SMS) and/or Rich Communication Service (RCS)). In some implementations, the applications and/or services can include an email application or service (e.g., Outlook®, Microsoft Exchange®, Google Mail®, iCloud Mail®, etc.). In some implementations, the applications and/or services can include a chat or instant messaging application or service (e.g., Signal®, Telegram®, WhatsApp®, Facebook Messenger®, applications or services utilizing, for example, Extensible Messaging and Presence Protocol (XMPP), etc.). In some implementations, the applications and/or services can include a collaboration application or service (e.g., Slack®, Microsoft Teams®, Discord®, etc.). In some implementations, the applications and/or services can include a social media application or service (e.g., Facebook®, Twitter®, Instagram®, etc.).

In some implementations, the user can make a selection from the option selection UI element 1106 via an external device, such as a keyboard, a mouse, and/or a touch sensitive display, wired or wirelessly coupled to the wearable multimedia device 101. In some implementations, the user can make a selection by performing one or more gestures that are detected and interpreted by the wearable multimedia device 101 (e.g., using the camera/video subsystem 820, depth sensor(s) 814, etc.). In some implementations, the user can make a selection through spoken commands that are detected and interpreted by the wearable multimedia device 101 (e.g., using the microphones 830 and a speech recognition engine).

Further, the user can instruct the wearable multimedia device 101 to transmit the message. For example, the user can select the send button 1108, perform a particular gesture, provide a particular spoken command, etc.). The wearable multimedia device 101 can transmit the message to the specified recipient (or recipients) in response to receiving the user's instructions.

Although an example message composition interface 1100 is shown in FIGS. 11A and 11B, in some implementations, a wearable multimedia device 101 can allow a user to compose and transmit a message without the use of a VI. For instance, in some implementations, a user can compose an electronic message using one or more spoken commands (e.g., rather than interacting with a VI). As an example, a user can provide speech input to the wearable multimedia device 101 that includes instructions to generate an electronic message and content for inclusion in the electronic message. The wearable multimedia device 101 can detect the speech input (e.g., using the microphones 830) and generate a draft of the electronic message for review by the user. Further, the user can provide additional speech input to the wearable multimedia device 101 that includes instructions to modify the electronic message. The wearable multimedia device 101 can detect the speech and modify the draft of the electronic message accordingly.

In some implementations, the wearable multimedia device 101 can receive speech input from the user, and infer content for inclusion in an electronic message based on the speech input. For example, the wearable multimedia device 101 can receive speech input from the user that specifies one or more content items for inclusion in the electronic message. Based on the speech input and other contextual information, the wearable multimedia device 101 can infer one or more additional content items for inclusion in the electronic message. Further, the wearable multimedia device 101 can generate an electronic message such that it includes at least some of the content specified by the user and at least some of the inferred content.

The implementations described herein can provide various technical benefits. For instance, these techniques allow a wearable multimedia device 101 to infer content for an electronic message, without requiring that a user expressly specify that content. Accordingly, the user can compose and transmit an electronic message using fewer speech inputs and/or shorter speech inputs (e.g., compared to composing and transmitting an electronic message absent the techniques described in this disclosure). Thus, the user can compose and transmit an electronic message more quickly and intuitively.

Further, these techniques can reduce the resources expended by the wearable multimedia device 101 during operation. For instance, a wearable multimedia device 101 expends resources—such as computational resources (e.g., CPU cycles), memory resources, storage resources, network resources, and/or battery resources—to detect and interpret a user's speech inputs and to carry out operations specified by the speech inputs. By reducing the number of speech inputs and/or the length of the speech inputs that are needed to generate and transmit an electronic message, the wearable multimedia device 101 can correspondingly reduce its expenditure of these resources and operate in a more efficient manner.

Figure 12:
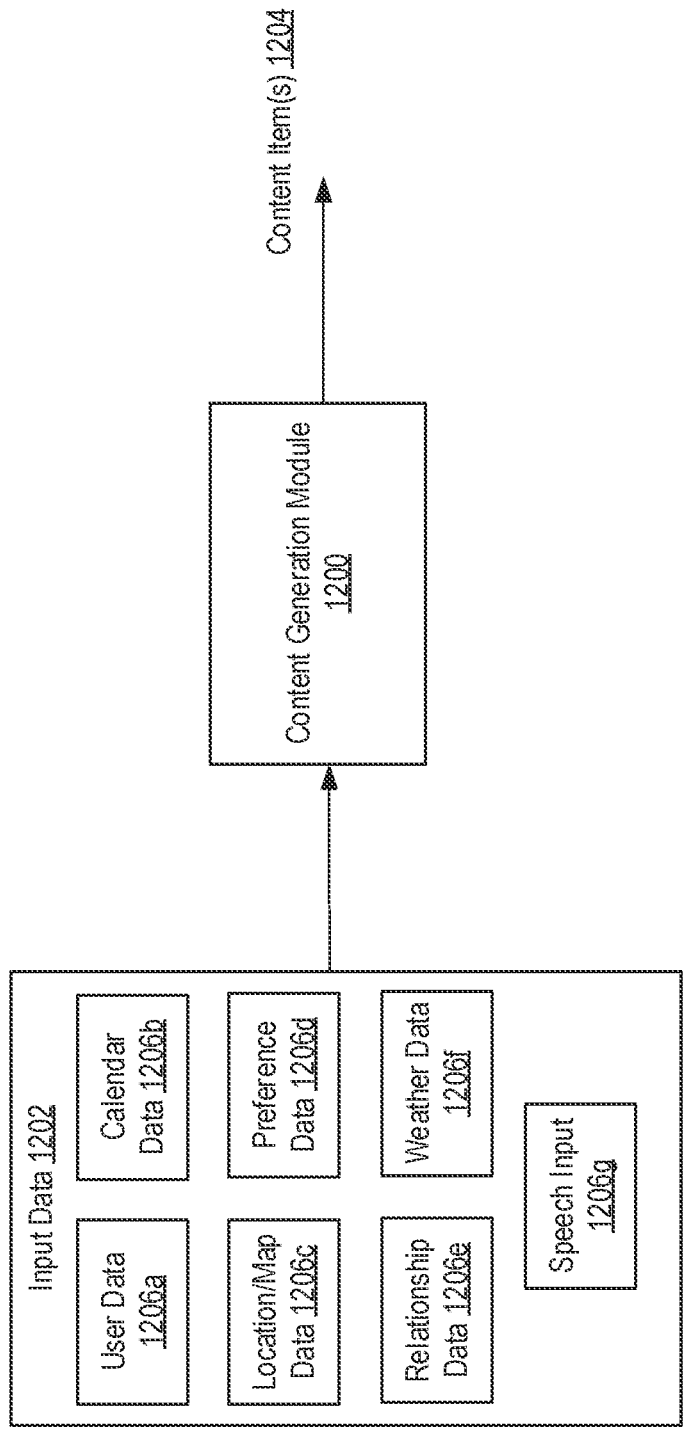
FIG. 12 is a diagram of an example content generation module for generating content items for inclusion in electronic messages.

Referring to FIG. 12, a wearable multimedia device 101 can infer content for inclusion in an electronic message using a content generation module 1200. In some implementations, the content generation module 1200 can be implemented, at least in part, as a component of the wearable multimedia device 101 (e.g., using one or more processors, circuitry, memory, data storage devices, etc.). In some implementations, the content generation module 1200 can be implemented, at least in part, as a component remote from the wearable multimedia device 101 (e.g., using one or more cloud computing platforms).

During an example operation of the content generation module 1200, the content generation module 1200 receives input data 1202, and generates (e.g., "infers") one or more content items 1204 based on the input data 1202. As described above, at least some of the content items 1204 can be included in an electronic message for transmission to one or more other devices.

In general, the input data 1202 provides contextual information regarding the subject matter of electronic message, the user of the wearable multimedia device 101, and/or the recipient(s) of the electronic message. In some implementations, at least some of the input data 1202 can be provided by the user of the wearable multimedia device 101 to the wearable multimedia device 101 directly (e.g., by manually inputting the data into the wearable multimedia device 101). In some implementations, the wearable multimedia device 101 can retrieve at least some of the input data 1202 from a component remote from the wearable multimedia device 101 (e.g., using one or more cloud computing platforms).

In some implementations, the input data 1202 can include user data 1206a regarding one or more users, such as the user of the wearable multimedia device 101 and/or the intended recipient(s) of an electronic message. As an example, user data 1206a can include contact information that can be used to communicate with a user electronically (e.g., user name, telephone number, e-mail address, etc.). As another example, user data 1206a can include a physical address associated with a user (e.g., mailing address, residential address, business address, etc.). As another example, user data 1206a can include demographic information regarding a user, such as the user's age, gender, etc. As another example, user data 1206a can include identity information, such as the user's name, nickname, etc. As another example, user data 1206a can include messages that were previously transmitted by a user and/or received from other user(s). For example, the user data 1206a can include a historical collection of e-mails, chat messages, text messages, or any other communications between users.

Further, the input data 1202 can include calendar data 1206b regarding one or more users, such as the user of the wearable multimedia device 101 and/or the intended recipient(s) of an electronic message. As an example, the calendar data 1206b can include information regarding scheduled appointments, meetings, activities, or other events for a user. For instance, the calendar data 1206b can include, for each event, the name of the event, the time and day of the event, the location of the event, a description of the event, and/or other any other information regarding the event. In some implementations, the calendar data 1206b can include, for each event, a category or classification of the event (e.g., a sporting event, travel, a meal, a concert, a show, a class, a work shift, a business meeting, a personal meeting, etc.). In some implementations, at least some of the calendar data 1206b can be obtained from a calendar application or service that is used by a user to organize her schedule (e.g., Outlook®, Microsoft Exchange®, Google Calendar®, Apple Calendar®, etc.), such as from the user's device, a cloud computing platform, or both.

Further, the input data 1202 can include location or map data 1206c. In some implementations, at least some of the location or map data 1206c can pertain to one or more users, such as the user of the wearable multimedia device 101 and/or the recipient(s) of an electronic message. As an example, the location or map data 1206c can include information regarding a user's current location (e.g., an address, geographical coordinates, etc.), such as location information obtained using a location processor 815 of a wearable multimedia device 101. As another example, the location or map data 1206c can include information regarding a user's previous locations (e.g., historical locations). As another example, the location or map data 1206c can include information regarding a user's home, place of work, or any other location associated with the user.

Further, at least some of the location or map data 1206c can pertain to one or more points of interest (POIs). Example POIs include stores, restaurants, bars, libraries, parks, recreation areas, stadiums or arenas, homes, apartments, landmarks, or any other locations to which a user may wish to travel. As an example, the location or map data 1206c can include information regarding a POI's location (e.g., an address, geographical coordinates, etc.). As another example, the location or map data 1206c can include additional information regarding a POI, such as the POIs operating hours, a category or classification of the POI (e.g., store, restaurant, bar, library, park, etc.), a description of the POI, or any other information regarding the POI. In some implementations, at least some of the location or map data 1206 can be provided by a mapping application or service (e.g., Google Maps®, Apple Maps®, MapQuest®, etc.).

Further, the input data 1202 can include preference data 1206d regarding one or more users, such as the user of the wearable multimedia device 101 and/or the recipient(s) of an electronic message. As an example, the preference data 1206d can include information regarding a user's preferences for particular venues. As another example, the preference data 1206d can include information regarding a user's preferences for particular meeting times (e.g., certain times of day, certain days of the week, certain days in the year, etc.). As another example, the preference data 1206d can include information regarding a user's preferences for particular types of cuisine (e.g., Japanese, Mexican, Chinese, Italian, etc.). As another example, the preference data 1206*d* can include information regarding a user's preferences for particular types of activities (e.g., sporting events, concerts, shows, eating, exercising, etc.). As another example, the preference data 1206*d* can include information regarding a user's preferences for indoor or outdoor events. As another example, the preference data 1206*d* can include information regarding a user's preferences for particular times for performing activities (e.g., during particular times of day, during daylight, during the night, etc.). As another example, the preference data 1206*d* can include information regarding a user's preferences for meeting with particular people.

In some implementations, at least some of the preference data 1206*d* regarding a user can be provided by the user to the wearable multimedia device 101 directly (e.g., by manually inputting the data into the wearable multimedia device 101).

In some implementations, the wearable multimedia device 101 can infer at least some of the preference data 1206*d* based on historical information regarding the user. For instance, the wearable multimedia device 101 can determine a user's activities over time, and determine trends and/or correlations in the user's activities that may indicative of a user's preferences. As an example, the wearable multimedia device 101 can determine that a user frequently travels to a particular venue or location, and infer that the user prefers that venue or location over others. As another example, the wearable multimedia device 101 can determine that a user frequently participates in a particular type of activity during certain times of day and/or days of the week, and infer that the user prefers participating in that type of activity at that time of day and/or on that day of the week. As another example, the wearable multimedia device 101 can determine that a user frequently eats at restaurants that serve a particular type of cuisine, and infer that the user performs prefers that type of cuisine. As another example, the wearable multimedia device 101 can determine that a user frequently participates in a particular type of activity with particular people, and infer that the user prefers participating in that type of activity with those people.

Although example inferences are described above, these are merely illustrative examples. In practice, the wearable multimedia device 101 can determine any trends or correlations in a user's activities, and based on the trends or correlations, infer any aspect of a user's preferences.

Further, the input data 1202 can include relationship data 1206*e* regarding one or more users, such as the user of the wearable multimedia device 101 and/or the recipient(s) of an electronic message. For instance, the relationship data 1206*e* can indicate the relationship between two or more users. As an example, a relationship between users can include a familial relationship (e.g., a sibling relationship, a parent/child relationship, a martial relationship, a domestic partner relationship, a grandparent/grandchild relationship, a cousin relationship, or any other relationship between family members). As another example, a relationship between users can include a workplace or business relationships (e.g., a coworker relationship, a supervisor/supervisee relationship, a trainer/trainee relationship, a client relationship, etc.). As another example, a relationship between users can include a relationship between friends or acquaintances. As another example, a relationship between users can include a relationship between classmates.

Further, the input data 1202 can include weather data 1206*f*. As an example, the weather data 1206*f* can include information regarding the past, present, and/or anticipated future weather at a user's location (e.g., the user's past location, present location, and/or anticipated future location). As another example, the weather data 1206*f* can include information regarding the past, present, and/or anticipated future weather at a particular venue or other location. In some implementations, at least some of the location or map data 1206*f* can be provided by a weather application or service (e.g., the National Weather Service, commercial weather services, etc.).

Further, the input data 1202 can include speech input 1206*g* from a user of the wearable multimedia device 101. For instance, the speech input 1206*g* can include a command by the user to the wearable multiple device 101 to generate an electronic message. Further, the speech input 1206*g* can include one or more content items for inclusion in the electronic message.

As an example, the speech input 1206*g* can identify one or more recipients for the electronic message. Further, the speech input can specify that the electronic message include an invitation or suggestion to the one or more recipients to meet with the user. Further still, the speech input can specify a venue or location for the meeting, and/or a time and/or data of the meeting.

The content generation module 1200 receives the input data 1202, and generates one or more content item(s) 1204 for inclusion in an electronic message based on the input data 1202.

In some implementations, the content generation module 1200 can generate one or more content items 1204 that are not expressly indicated by the speech input 1206*g*. Further, in some implementations, the speech input 1206*g* can indicate content corresponding to one or more first categories of data, and the content generation module 1200 can generate content corresponding to one or more other categories of data. Example categories of data include the recipient(s) of an electronic message, a location associated with the electronic message (e.g., a meeting location or venue), and/or a time associated with the electronic message (e.g., a meeting time).

As an example, the speech input 1206*g* can identify a recipient for an electronic message. Further, the speech input 1206*g* can specify that the electronic message include an invitation to that recipient to meet with the user. Based on the other input data 1202, the content generation module 1200 can infer additional content items for inclusion in the electronic message, such as a suggested venue or location for the meeting, a suggested date and/or time for the meeting, or any other information that may be relevant to the meeting.

Further, the wearable multimedia device 101 can generate a draft of the electronic message that includes at least some of the content item(s) 1204, and present the draft to the user for review. In some implementations, the user can instruct the wearable multimedia device 101 to modify the draft (e.g., remove content, modify content, and/or add content). For example, the user can provide additional speech input including a command to modify the draft in a particular manner. In response, the wearable multimedia device 101 can modify the draft in accordance with the user's command.

Further, the user can instruct the wearable multimedia device 101 to transmit the draft (e.g., by provide additional speech input including a command to transmit the draft). In response, the wearable multimedia device 101 can transmit the draft to the recipient(s).

In some implementations, when instructing the wearable multimedia device 101 generate an electronic message, user can provide speech input in the form of a command that is addressed to the wearable multimedia device 101. Further, the user need not recite the contents of the electronic message verbatim. Instead, the user can provide natural language commands to the wearable multimedia device 101, as if she were speaking to a human assistant.

Figure 13:
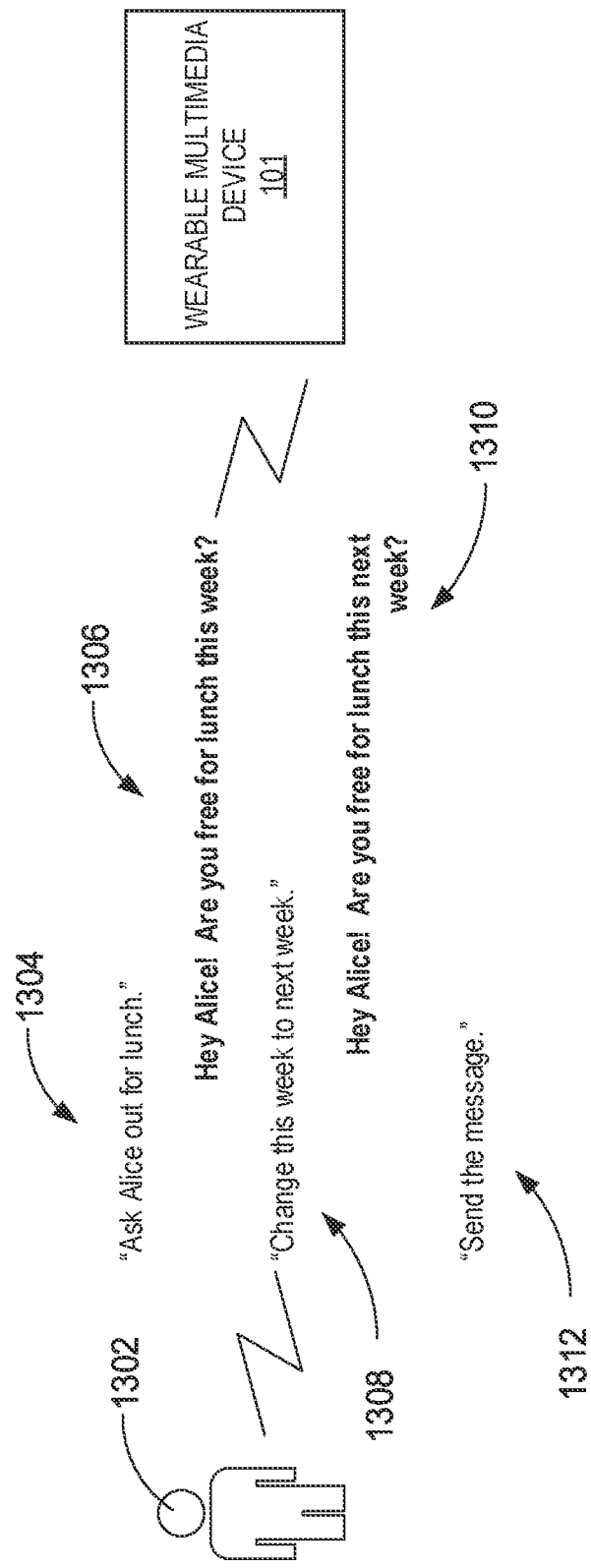
FIGS. 13-16 are diagrams of example operations performed by a wearable multimedia device.

For example, referring to FIG. 13, a user 1302 can provide a first speech input 1304 including a natural language command to generate an electronic message, and proposed content for inclusion in the electronic message. In this example, the first speech input 1304 is "Ask Alice out for lunch," which includes a proposed recipient for the electronic message, and specifies that the electronic message include an invitation to the recipient for lunch.

The first speech input 1304 is provided to the content generation module 1200 (e.g., as speech input 1206g, as described with reference to FIG. 12). Further, the content generation module 1200 retrieves additional input data 1202, such as user data 1206a, calendar data 1206b, location or map data 1206c, preference data 1206d, relationship data 1206e, and/or weather data 1206f. Based on the first speech input 1304 and the additional input data 1202, the content generation module 1200 generates additional content item(s) 1204 for inclusion in the electronic message. For instance, in the example shown in FIG. 13, the content generation module 1200 generates an additional content item that indicates a proposed time for the meeting (e.g., "this week").

Further, the wearable multimedia device 101 generates a draft 1306 of the electronic message (including the additional content item generated by the content generation module 1200), and presents the draft 1306 to the user 1302 for review. In some implementations, the wearable multimedia device 101 can present the draft 1306 to the user 1302 visually (e.g., using a message composition interface, such as the message composition interface 1102). In some implementations, the wearable multimedia device 101 can present the draft 1306 to the user 1302 aurally (e.g., by generating sound using the speakers 828, such as synthesized speech reciting the draft 1306).

Further, the user 1302 can provide a second speech input 1308 including a natural language command to modify the draft 1306. For instance, the second speech input 1308 can identify a particular portion of the draft 1306 (e.g., a certain type of data or content included in the draft 1306), and specify a particular modification to that portion of the draft 1306. In this example, the second speech input 1308 is "Change this week to next week," which identifies a particular portion of the draft 1306 (e.g., the suggested time, "this week"), and specifies a modification to that portion (e.g., change the suggested time to "next week" instead).

In response, the wearable multimedia device 101 generates a modified draft 1310 of the electronic message (including the modifications specified by the user 1302), and presents the modified draft 1310 to the user 1302 for review. In some implementations, the wearable multimedia device 101 can present the draft 1310 to the user 1302 visually, such as using a message composition interface. In some implementations, the wearable multimedia device 101 can present the modified draft 1310 to the user 1302 aurally, such as by generating synthesized speech reciting the modified draft 1310.

Further, the user 1302 can provide a third speech input 1312 including a natural language command to transmit the modified draft 1310 (e.g., "send the message"). In response, the wearable multimedia device 101 transmits the modified draft 1310 to the previously identified recipient (e.g., using the communications network 1002).

In the example shown in FIG. 13, a user can instruct the wearable multimedia device 101 to modify a draft of an electronic message, at least in part, by replacing a content item of the electronic message (e.g., a suggested time for a meeting) with another content item (e.g., a revised time for the meeting). In some implementations, a user can also instruct the wearable multimedia device 101 to modify a draft of an electronic message, at least in part, by adding one or more additional content items to the electronic message.

Figure 14:
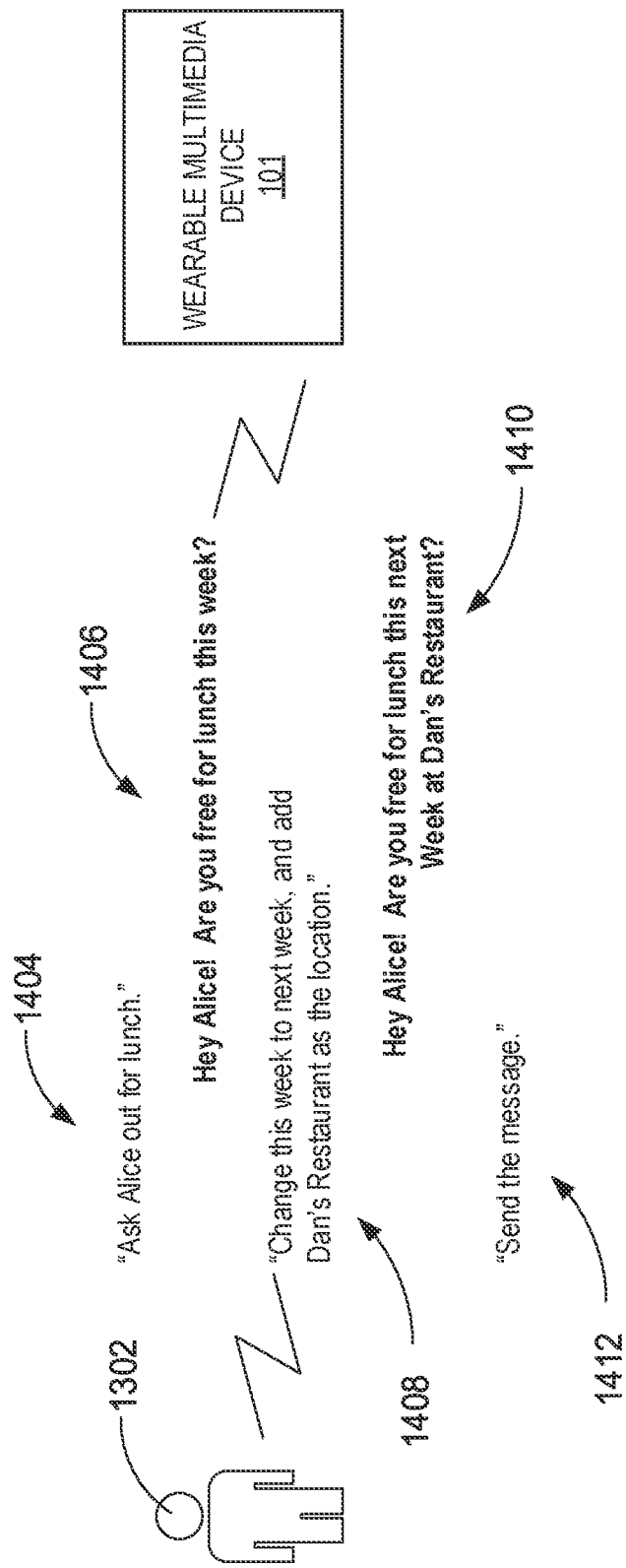

As an example, referring to FIG. 14, a user 1302 can provide a first speech input 1404 including a natural language command to generate an electronic message, and proposed content for inclusion in the electronic message. In this example, the first speech input 1404 is "Ask Alice out for lunch," which includes a proposed recipient for the electronic message, and specifies that the electronic message include an invitation to the recipient for lunch.

The first speech input 1404 is provided to the content generation module 1200 (e.g., as speech input 1206g, as described with reference to FIG. 12). Further, the content generation module 1200 retrieves additional input data 1202, such as user data 1206a, calendar data 1206b, location or map data 1206c, preference data 1206d, relationship data 1206e, and/or weather data 1206f. Based on the first speech input 1404 and the additional input data 1202, the content generation module 1200 generates additional content item(s) 1204 for inclusion in the electronic message. For instance, in the example shown in FIG. 14, the content generation module 1200 generates an additional content item that indicates a proposed time for the meeting (e.g., "this week").

Further, the wearable multimedia device 101 generates a draft 1406 of the electronic message (including the additional content item generated by the content generation module 1200), and presents the draft 1406 to the user 1302 for review. In some implementations, the wearable multimedia device 101 can present the draft 1406 to the user 1302 visually (e.g., using a message composition interface, such as the message composition interface 1102). In some implementations, the wearable multimedia device 101 can present the draft 1406 to the user 1302 aurally (e.g., by generating sound using the speakers 828, such as synthesized speech reciting the draft 1406).

Further, the user 1302 can provide a second speech input 1408 including a natural language command to modify the draft 1406. For instance, the second speech input 1408 can identify a particular portion of the draft 1406 (e.g., a certain type of data or content included in the draft 1406), and specify a particular modification to that portion of the draft 1406. In this example, the second speech input 1408 is "Change this week to next week, and add Dan's Restaurant as the location." This second speech input 1408 identifies a first portion of the draft 1406 (e.g., the suggested time, "this week"), and specifies a modification to that portion (e.g., change the suggested time to "next week" instead). Further, this second speech input 1408 specifies that additional content be added to the draft 1406 (e.g., the addition of Dan's Restaurant as the meeting location).

In response, the wearable multimedia device 101 generates a modified draft 1410 of the electronic message (including the modifications specified by the user 1302), and presents the modified draft 1410 to the user 1302 for review. In some implementations, the wearable multimedia device 101 can present the draft 1410 to the user 1302 visually, such as using a message composition interface. In some implementations, the wearable multimedia device 101 can present the modified draft 1410 to the user 1302 aurally, such as by generating synthesized speech reciting the modified draft 1410.

Further, the user 1302 can provide a third speech input 1412 including a natural language command to transmit the modified draft 1410 (e.g., "send the message"). In response, the wearable multimedia device 101 transmits the modified draft 1410 to the previously identified recipient (e.g., using the communications network 1002).

Figure 15:
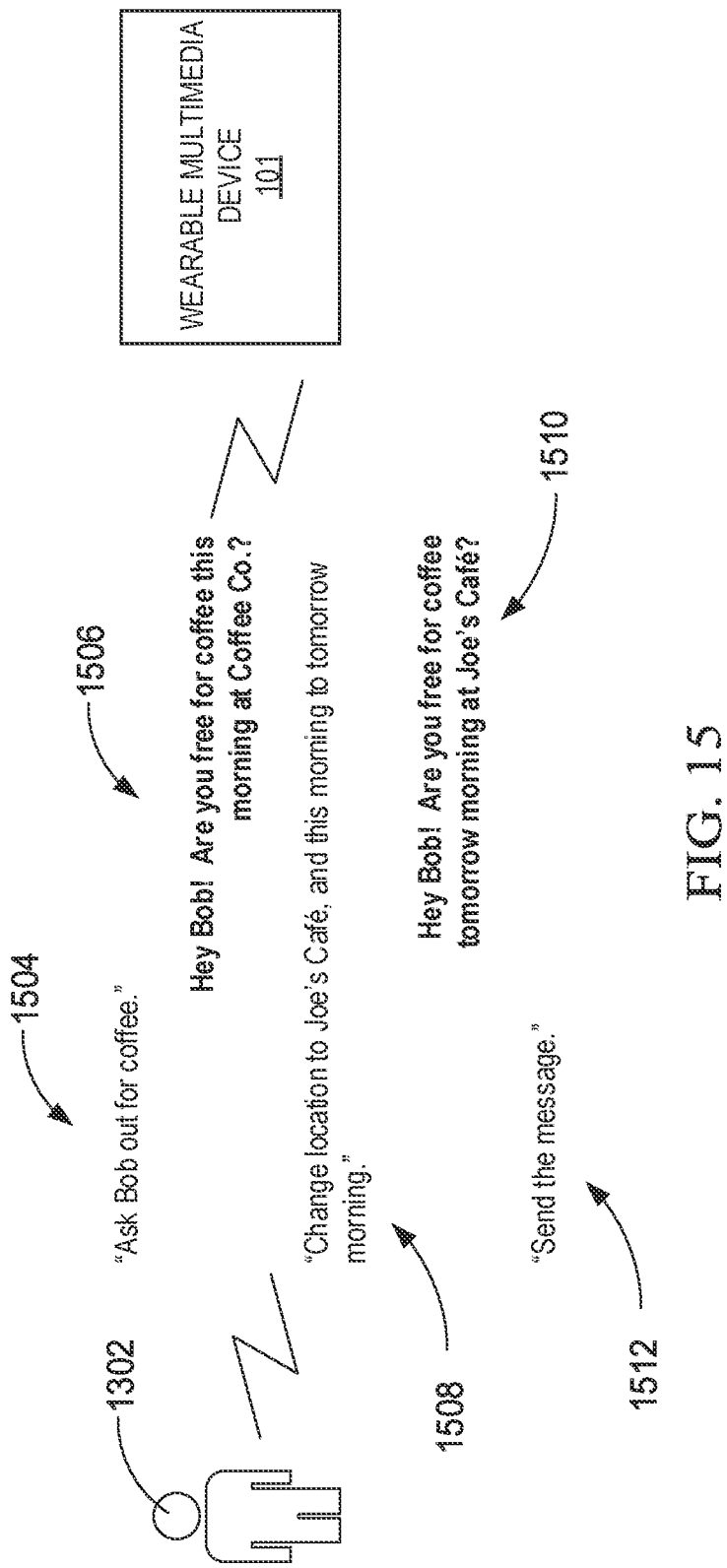

As another example, referring to FIG. 15, a user 1302 can provide a first speech input 1504 including a natural language command to generate an electronic message, and proposed content for inclusion in the electronic message. In this example, the first speech input 1504 is "Ask Bob out for coffee," which includes a proposed recipient for the electronic message, and specifies that the electronic message include an invitation to the recipient for coffee.

The first speech input 1504 is provided to the content generation module 1200 (e.g., as speech input 1206g, as described with reference to FIG. 12). Further, the content generation module 1200 retrieves additional input data 1202, such as user data 1206a, calendar data 1206b, location or map data 1206c, preference data 1206d, relationship data 1206e, and/or weather data 1206f. Based on the first speech input 1504 and the additional input data 1202, the content generation module 1200 generates additional content item(s) 1204 for inclusion in the electronic message. For instance, in the example shown in FIG. 15, the content generation module 1200 generates an additional content item that indicates a proposed time for the meeting (e.g., "this morning") and a proposed venue for the meeting (e.g., "Coffee Co.").

Further, the wearable multimedia device 101 generates a draft 1506 of the electronic message (including the additional content item generated by the content generation module 1200), and presents the draft 1506 to the user 1302 for review. In some implementations, the wearable multimedia device 101 can present the draft 1506 to the user 1302 visually (e.g., using a message composition interface, such as the message composition interface 1102). In some implementations, the wearable multimedia device 101 can present the draft 1506 to the user 1302 aurally (e.g., by generating sound using the speakers 828, such as synthesized speech reciting the draft 1506).

Further, the user 1302 can provide a second speech input 1508 including a natural language command to modify the draft 1506. For instance, the second speech input 1408 can identify a particular portion of the draft 1506 (e.g., a certain type of data or content included in the draft 1506), and specify a particular modification to that portion of the draft 1506. In this example, the second speech input 1508 is "Change location to Joe's Cafe, and this morning to tomorrow morning." This second speech input 1508 identifies a first portion of the draft 1506 (e.g., the suggested time, "this morning"), and specifies a modification to that portion (e.g., change the suggested time to "tomorrow morning" instead). Further, this second speech input 1508 identifies a second portion of the draft 1506 (e.g., the suggested venue, "Coffee Co."), and specifies a modification to that portion (e.g., change the suggested venue to "Joe's Cafe" instead).

In response, the wearable multimedia device 101 generates a modified draft 1510 of the electronic message (including the modifications specified by the user 1302), and presents the modified draft 1510 to the user 1302 for review. In some implementations, the wearable multimedia device 101 can present the draft 1510 to the user 1302 visually, such as using a message composition interface. In some implementations, the wearable multimedia device 101 can present the modified draft 1510 to the user 1302 aurally, such as by generating synthesized speech reciting the modified draft 1510.

Further, the user 1302 can provide a third speech input 1512 including a natural language command to transmit the modified draft 1310 (e.g., "send the message"). In response, the wearable multimedia device 101 transmits the modified draft 1510 to the previously identified recipient (e.g., using the communications network 1002).

In some implementations, a user can also instruct the wearable multimedia device 101 to modify a draft of an electronic message, at least in part, by modifying the recipients of the electronic message.

Figure 16:
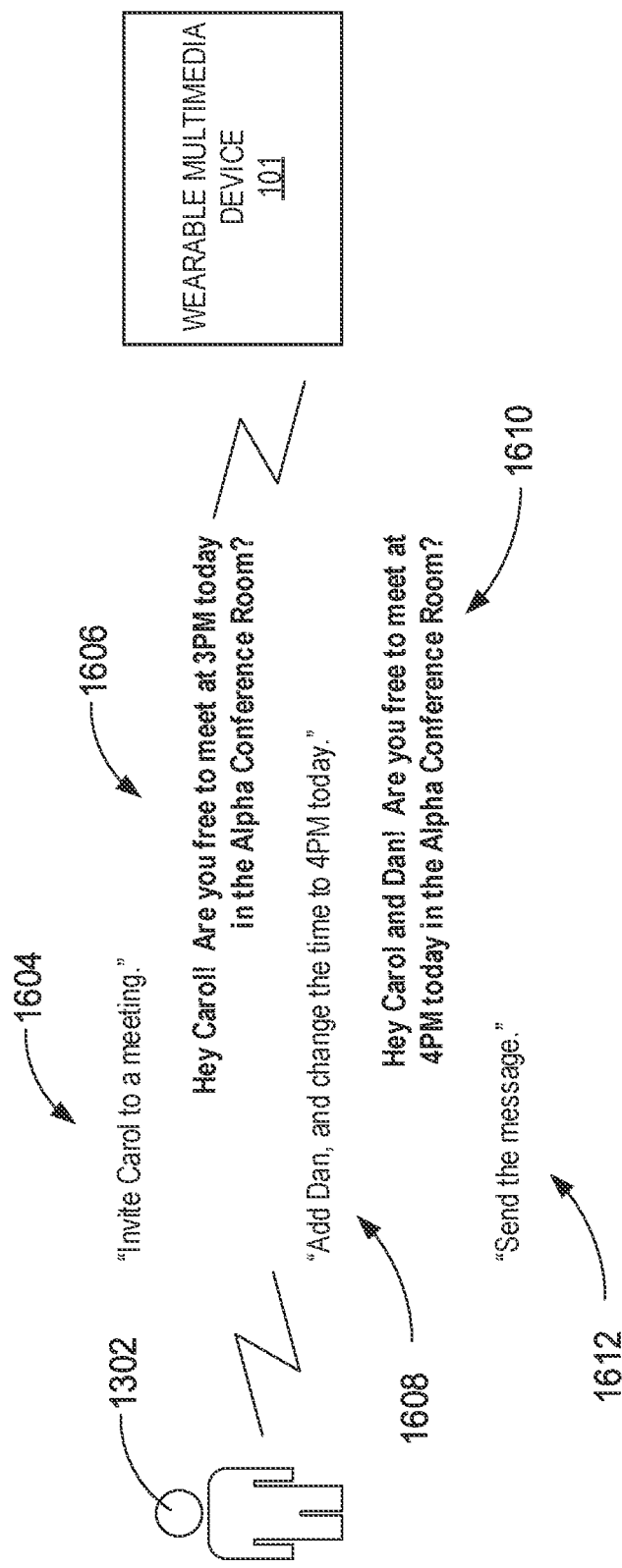

As an example, referring to FIG. 16, a user 1302 can provide a first speech input 1604 including a natural language command to generate an electronic message, and proposed content for inclusion in the electronic message. In this example, the first speech input 1604 is "Invite Carol to a meeting," which includes a proposed recipient for the electronic message, and specifies that the electronic message include an invitation to the recipient to a meeting.

The first speech input 1604 is provided to the content generation module 1200 (e.g., as speech input 1206g, as described with reference to FIG. 12). Further, the content generation module 1200 retrieves additional input data 1202, such as user data 1206a, calendar data 1206b, location or map data 1206c, preference data 1206d, relationship data 1206e, and/or weather data 1206f. Based on the first speech input 1604 and the additional input data 1202, the content generation module 1200 generates additional content item(s) 1204 for inclusion in the electronic message. For instance, in the example shown in FIG. 16, the content generation module 1200 generates an additional content item that indicates a proposed time for the meeting (e.g., "3 PM today") and a proposed venue for the meeting (e.g., the "Alpha Conference Room.").

Further, the wearable multimedia device 101 generates a draft 1606 of the electronic message (including the additional content item generated by the content generation module 1200), and presents the draft 1606 to the user 1302 for review. In some implementations, the wearable multimedia device 101 can present the draft 1606 to the user 1302 visually (e.g., using a message composition interface, such as the message composition interface 1102). In some implementations, the wearable multimedia device 101 can present the draft 1606 to the user 1302 aurally (e.g., by generating sound using the speakers 828, such as synthesized speech reciting the draft 1606).

Further, the user 1302 can provide a second speech input 1608 including a natural language command to modify the draft 1606. For instance, the second speech input 1408 can identify a particular portion of the draft 1606 (e.g., a certain type of data or content included in the draft 1606), and specify a particular modification to that portion of the draft 1606. In this example, the second speech input 1608 is "Add Dan, and change the time to 4 PM today." This second speech input 1508 specifies an additional recipient for the electronic message (e.g., "Dan"). Further, this second speech input 1508 identifies a portion of the draft 1606 (e.g., the suggested time, "4 PM today"), and specifies a modification to that portion (e.g., change the suggested time to "4 PM today" instead).

In response, the wearable multimedia device 101 generates a modified draft 1610 of the electronic message (including the modifications specified by the user 1302), and presents the modified draft 1610 to the user 1302 for review.

In some implementations, the wearable multimedia device 101 can present the draft 1610 to the user 1302 visually, such as using a message composition interface. In some implementations, the wearable multimedia device 101 can present the modified draft 1610 to the user 1302 aurally, such as by generating synthesized speech reciting the modified draft 1610.

Further, the user 1302 can provide a third speech input 1612 including a natural language command to transmit the modified draft 1310 (e.g., "send the message"). In response, the wearable multimedia device 101 transmits the modified draft 1610 to the previously identified recipient (e.g., using the communications network 1002).

As described above, the wearable multimedia device 101 and/or the content generation module 1200 can infer content item(s) and/or electronic messages (or portions thereof) based on any combination of the input data 1202. Example inferences are described below.

In some implementations, the wearable multimedia device 101 and/or the content generation module 1200 can infer a meeting location based on the location of the user and the recipient(s) of an electronic message. As an example, if the user did not specify a meeting location for inclusion in an electronic message, the wearable multimedia device 101 and/or the content generation module 1200 can determine the current locations of the user and the recipient(s) of the electronic message (e.g., using the location or map data 1206*c*). Based on this information, the wearable multimedia device 101 and/or the content generation module 1200 can suggest a meeting location that is equidistant (or approximately equidistant) from the user and the recipient(s). As another example, the wearable multimedia device 101 and/or the content generation module 1200 can suggest a meeting location for which it will take the same (or approximately the same) time for each of the user and the recipient(s) to reach.

In some implementations, the wearable multimedia device 101 and/or the content generation module 1200 can infer a meeting location based on preferences of the user and/or the recipient(s) of the electronic message. As an example, if the user did not specify a meeting location for inclusion in an electronic message, the wearable multimedia device 101 and/or the content generation module 1200 can determine the preferences of the user and/or the recipient(s) of the electronic message for meeting locations (e.g., using the preference data 1206*d*). As an example, the preference data 1206*d* may indicate that the user and/or recipient(s) prefer a particular restaurant, cafe, bar, etc. As another example, the preference data 1206*d* may indicate that the user and/or recipient(s) prefer restaurants having a particular type of cuisine. Based on this information, the wearable multimedia device 101 and/or the content generation module 1200 can suggest a meeting location that is consistent with the preferences of the user and/or the recipient(s).

In some implementations, the wearable multimedia device 101 and/or the content generation module 1200 can infer a meeting time based on the schedules of the user and/or the recipient(s) of the electronic message. As an example, if the user did not specify a meeting time for inclusion in an electronic message, the wearable multimedia device 101 and/or the content generation module 1200 can obtain calendar information for the user and the recipient(s) of the electronic message (e.g., using the calendar data 1206*b*), and determine periods of time in which the user and the recipient(s) are available to meet. As an example, the wearable multimedia device 101 and/or the content generation module 1200 can identify periods of time for which the user and the recipient(s) do not have any scheduled meetings or events. Based on this information, the wearable multimedia device 101 and/or the content generation module 1200 can suggest a meeting time that is consistent with the availability of the user and the recipient(s).

In some implementations, the wearable multimedia device 101 and/or the content generation module 1200 can infer a meeting time based on an expected travel time of the user and/or the recipient(s) of the electronic message to the meeting location. As an example, if the user did not specify a meeting time for inclusion in an electronic message, the wearable multimedia device 101 and/or the content generation module 1200 can determine the travel time of each of the user and the recipient(s) to the meeting location (e.g., from their current or anticipated future locations). In some implementations, this can be determined, at least in part, using the location or map data 1206*c* and/or the calendar data 1206*b* (e.g., which may indicate a user's or recipient's anticipated future location). Based on this information, the wearable multimedia device 101 and/or the content generation module 1200 can suggest a meeting time that allows each of the user and recipient(s) to travel to the meeting location by the suggested time.

In some implementations, the wearable multimedia device 101 and/or the content generation module 1200 can infer a meeting location and/or meeting time based on the weather or anticipated future weather). As an example, if the user specified a meeting location for inclusion in an electronic message, but did not specify a meeting time, the wearable multimedia device 101 and/or the content generation module 1200 can determine the weather (or anticipated future weather) at the meeting location at several different candidate times. Further, the wearable multimedia device 101 and/or the content generation module 1200 can suggest, from among the candidate times, a particular time during which the weather is expected to be favorable (e.g., to avoid rain, snow, high wind, etc.).

As another example, if the user specified a meeting time for inclusion in an electronic message, but did not specify a meeting location, the wearable multimedia device 101 and/or the content generation module 1200 can determine the weather (or anticipated future weather) at the meeting time at several different candidate locations. Further, the wearable multimedia device 101 and/or the content generation module 1200 can suggest, from among the candidate location, a particular location at which the weather is expected to be favorable at the specified time (e.g., to avoid rain, snow, high wind, etc.).

In some implementations, the wearable multimedia device 101 and/or the content generation module 1200 can infer a meeting location and/or meeting time based on previous interactions between the user and the recipient(s) of an electronic message. As an example, if the user did not specify a meeting location and/or meeting time for inclusion in an electronic message, the wearable multimedia device 101 and/or the content generation module 1200 can determine previous interactions between the user and the recipient(s). For example, based on the location or map data 1206*c* and/or the calendar data 1206*b*, the wearable multimedia device 101 and/or the content generation module 1200 can determine that the user and the recipient(s) frequently met at a particular meeting location and/or frequently met at a particular time of day. Based on this information, the wearable multimedia device 101 and/or the content generation module 1200 can suggest that meeting location and/or that time of day for the upcoming meeting between them.

In some implementations, the wearable multimedia device 101 and/or the content generation module 1200 can generate content item(s) according to different levels of formality, depending on the circumstances. For instance, if the relationship between the user and the recipient(s) is more friendly or close, the content generation module 1200 can generate content item(s) that are more informal in nature. Further, if the relationship between the user and the recipient(s) is more formal, the content generation module 1200 can generate content item(s) that are more formal in nature.

As an example, the wearable multimedia device 101 and/or the content generation module 1200 can determine that the user and recipient are married to one another (e.g., based on the relationship data 1206*e*). This indicates that the user and recipient are likely have a friendly or close relationship with one another. Accordingly, the wearable multimedia device 101 and/or the content generation module 1200 can generate content item(s) according to a lesser degree of formality. For example, the content item(s) can be generated such that they include slang, nicknames, initialisms (e.g., "LOL," "BRB," etc.), short hand, and/or informal grammar (e.g., incomplete sentences, etc.).

As an example, the wearable multimedia device 101 and/or the content generation module 1200 can determine that the user and recipient have an employee/supervisor relationship (e.g., based on the relationship data 1206*e*). This indicates that the user and recipient are likely have a formal relationship with one another. Accordingly, the wearable multimedia device 101 and/or the content generation module 1200 can generate content item(s) according to a greater degree of formality. For example, the content item(s) can be generated such that they do not include slang, nicknames, initialisms, short hand, and/or informal grammar (e.g., incomplete sentences, etc.).

In some implementations, each content item can be associated with a formality metric representing the degree of formality of that content item. As an example, a content item having a higher valued content formality metric may be associated with more formal usage, whereas a content item having a lower valued content formality metric may be associated with more informal usage. Further, each relationship between users can associated a formality metric representing the degree of formality between them. As an example, a relationship having a higher valued relationship formality metric may indicate a more formal relationship between users, whereas a relationship having a lower valued relationship formality metric may indicate a less formal relationship between users.

Further, the wearable multimedia device 101 and/or the content generation module can select a content item for inclusion in an electronic message based the formality of the relationship between the users (e.g., based on the relationship formality metric of that relationship), and the formality of each of several candidate content items (e.g., based on the content formality metric of each of those content items). For example, if the relationship between the user and a recipient is associated with a high relationship formality metric, the wearable multimedia device 101 and/or the content generation module can select a content item having a high content formality metric. As another example, if the relationship between the user and a recipient is associated with a low relationship formality metric, the wearable multimedia device 101 and/or the content generation module can select a content item having a low content formality metric.

In some implementations, the wearable multimedia device 101 and/or the content generation module 1200 can infer a salutation, valediction, and/or a signature for an electronic message based previous communications between the users and the recipient(s). As an example, if the user previously transmitted electronic messages to the recipient(s) using a particular salutation (e.g., "Hi Alice," "Dear Alice," etc.), the wearable multimedia device 101 and/or the content generation module 1200 can infer that a similar salutation be used for a new electronic message between those users. As another example, if the user previously transmitted electronic messages to the recipient(s) using a particular valediction (e.g., "Sincerely," "Regards," etc.), the wearable multimedia device 101 and/or the content generation module 1200 can infer that a similar valediction be used for a new electronic message between those users. As another example, if the user previously transmitted electronic messages to the recipient(s) using a particular signature (e.g., a signature block having the user's name, contact information, title, affiliation, etc.), the wearable multimedia device 101 and/or the content generation module 1200 can infer that a similar signature be used for a new electronic message between those users.

In some implementations, the wearable multimedia device 101 and/or the content generation module 1200 can infer a salutation, valediction, and/or signature for an electronic message based on data regarding the user, the recipient(s) of the electronic message, and/or relationship between them.

As an example, the wearable multimedia device 101 and/or the content generation module 1200 may can determine the user is affiliated with a first organization (e.g., a first company, corporation, institution, etc.), and that one or more first recipients are affiliated with a second organization (e.g., a different company, corporation, institution, etc.). Based on this determination, the wearable multimedia device 101 and/or the content generation module 1200 may infer that a first salutation, valediction, and/or signature be used in an electronic message between them. For example, the wearable multimedia device 101 and/or the content generation module 1200 can select a salutation, valediction, and/or signature that would be suitable for communications between individuals from different organizations (e.g., a salutation, valediction, and/or signature having a high degree of formality).

As another example, the wearable multimedia device 101 and/or the content generation module 1200 may can determine the user and one or more second recipients are affiliated with the same organization (e.g., the same company, corporation, institution, etc.). Based on this determination, the wearable multimedia device 101 and/or the content generation module 1200 may infer that a second salutation, valediction, and/or signature be used in an electronic message between them. For example, the wearable multimedia device 101 and/or the content generation module 1200 can select a salutation, valediction, and/or signature that would be suitable for communications between individuals from the same organization (e.g., a salutation, valediction, and/or signature having a moderate degree of formality).

As another example, the wearable multimedia device 101 and/or the content generation module 1200 may can determine the user and one or more third recipients have a personal relationship with one another, such as a familial relationship or a relationship between friends. Based on this determination, the wearable multimedia device 101 and/or the content generation module 1200 may infer that a third salutation, valediction, and/or signature be used in the electronic message. For example, the wearable multimedia device 101 and/or the content generation module 1200 can select a salutation, valediction, and/or signature that would be suitable for communications between family or friends (e.g., a salutation, valediction, and/or signature having a low degree of formality).

In some implementations, the wearable multimedia device 101 and/or the content generation module 1200 can determine a user's affiliation with one or more organizations based on contact information regarding the user (e.g., information listed in a contact card, business card, directory, etc.). In some implementations, the wearable multimedia device 101 and/or the content generation module 1200 can determine a user's affiliation with one or more organizations based on a user's e-mail address (e.g., based on the domain name in the user's e-mail address). In some implementations, the wearable multimedia device 101 and/or the content generation module 1200 can determine a user's affiliation with one or more organizations based on a signature used by the user in an electronic message (e.g., a signature listing the organization with which the user is affiliated).

In some implementations, the wearable multimedia device 101 can transmit an electronic message to the recipient(s) immediately upon receiving an instruction from the user to do so. For example, the user can provide speech input instructing the wearable multimedia device 101 to transmit an electronic message (e.g., "send the message") and/or select a graphical user interface element instructing the wearable multimedia device 101 to transmit the electronic message (e.g., selecting a "send" button, such as the send button 1108 shown in FIG. 11B). In response, the wearable multimedia device 101 can immediately transmit the electronic message to the recipient(s).

In some implementations, the wearable multimedia device 101 can delay transmission of an electronic message to the recipient(s) depending on an expected availability of the recipient(s). For example, the user can instruct the wearable multimedia device 101 to transmit an electronic message (e.g., by providing speech input, selecting a graphical user interface element, etc.). In response, the wearable multimedia device 101 can retrieve information regarding the availability of the recipient(s) at that time.

For example, the wearable multimedia device 101 can retrieve calendar data for the recipient(s) (e.g., calendar data 1206b), and determine an availability of the recipient(s) based on the calendar data.

As another example, if the message is to be transmitted to the recipient(s) using a particular application or service, the wearable multimedia device 101 can retrieve presence information for the recipient(s) with respect to that application or service. Presence information can represent, for example, the ability and/or willingness of the recipient(s) to communicate using a particular application and/or service. For instance, a recipient's presence information may indicate that she is available to correspond with others via a certain application and/or service (e.g., "available," "active," etc.), whereas her presence information may indicate that she is unavailable to correspond with others via another application and/or service (e.g., "busy," "away," "do not disturb," "offline," etc.).

If the recipient(s) are available (e.g., the recipient(s) are not scheduled to attend any meetings or other events that that time, the recipient(s) presence information indicates that they are available to receive electronic messages, etc.), the wearable multimedia device 101 can immediately transmit the electronic message to the recipient(s). If the recipient(s) are not available (e.g., the recipient(s) are scheduled to attend a meeting or other event that that time the recipient(s) presence information indicates that they are not available to receive electronic messages, etc.), the wearable multimedia device 101 can delay transmission of the electronic message until the recipient(s) are available (e.g., by determining a transmission time in the future during which the recipient(s) are available). This can be beneficial, for example, in reducing the likelihood that the electronic message will interrupt the recipient(s) during a meeting or event. Further, this can increase the likelihood that the recipient(s) will review and respond to the electronic message when they are become available again (e.g., by presenting the electronic message to the recipient(s) at that time, such that the electronic message is less likely to be ignored or forgotten).

Figure 17:
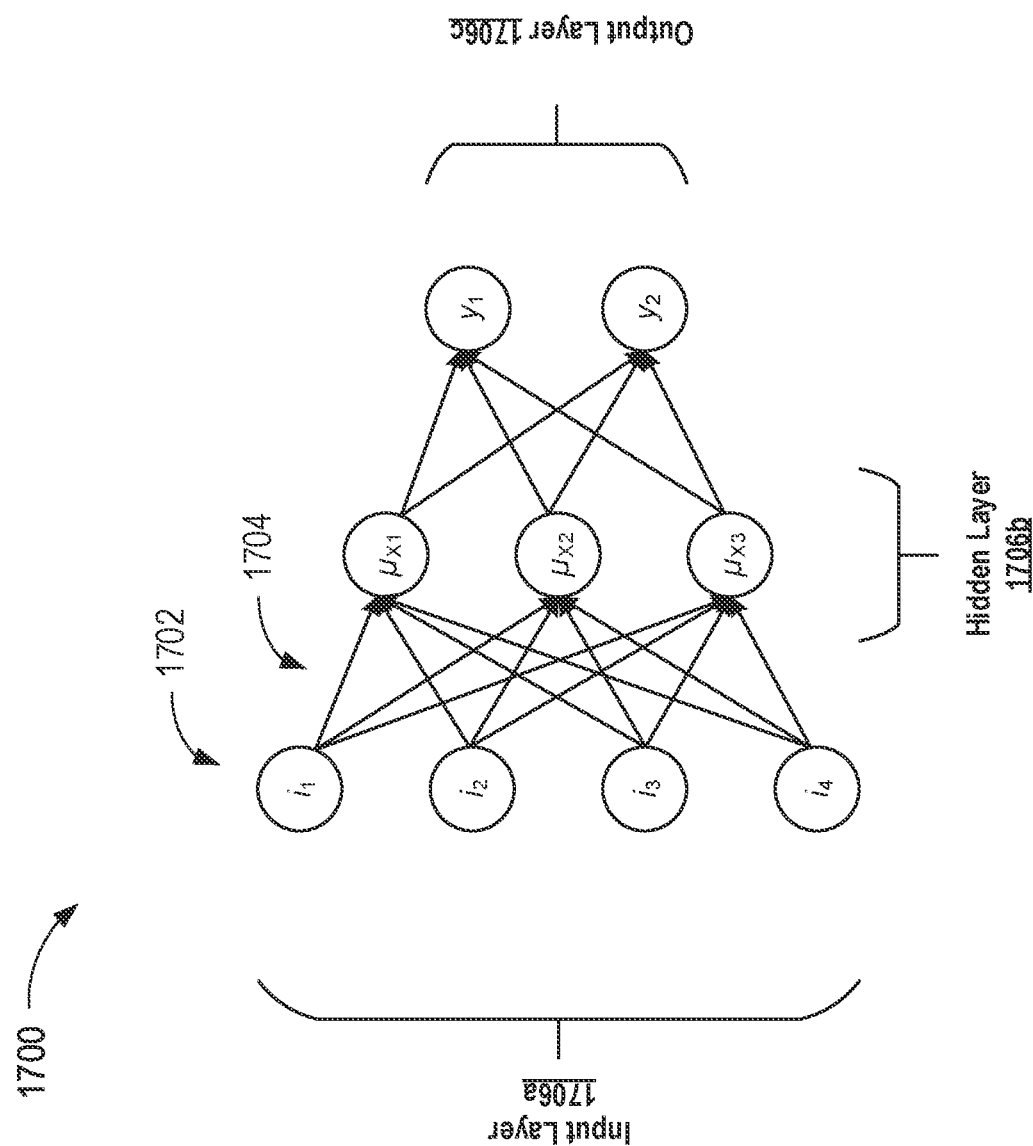
FIG. 17 is a diagram of an example neural network.

In some implementations, the wearable multimedia device 101 can generate electronic messages and/or content items for inclusion in electronic messages, at least in part, using a machine learning process, such as a machine learning process performing using one or more neural networks. A simplified example of a neural network 1200 is shown in FIG. 17.

The neural network 1700 includes several nodes 1702 (often called "neurons") interconnected with another by interconnections 1704. Further, the nodes 1702 are arranged according to multiple layers, including an input layer 1706a, a hidden layer 1706b, and an output layer 1706c. The arrangement of the nodes 1702 and the interconnections 1704 between them represent a mathematical transformation of input data (e.g., as received by the nodes of the input layer 1706a) into corresponding output data (e.g., as output by the nodes of the output layer 1706c). In some implementations, the input data can represent one or more data points obtained by the wearable multimedia device 101 and/or the content generation module 1200 (e.g., the input data 1202), and the output data can represent one or more corresponding content item(s) 1204 and/or draft electronic messages generated by the wearable multimedia device 101 and/or the content generation module 1200 based on the input data.

The nodes 1702 of the input layer 1706a receive input values and output the received input values to respective nodes of the next layer of the neural network 1700. In this example, the neural network 1700 includes several inputs $i_1$, $i_2$, $i_3$, and $i_4$, each of which receives a respective input value and outputs the received value to one or more of the nodes $\mu_{x1}$, $\mu_{x2}$, and $\mu_{x3}$ (e.g., as indicated by the interconnections 1704).

In some implementations, at least some of the input data 1202 can be used as inputs for the nodes of the input layer 1706a. For example, at least some of the input data 1202 can be expressed numerically (e.g., assigned a numerical score or value), and input into the nodes of the input layer 1706a.

The nodes of the hidden layer 1706b receive input values (e.g., from the nodes of the input layer 1706a or nodes of other hidden layers), applies particular transformations to the received values, and outputs the transformed values to respective nodes of the next layer of the neural network 1700 (e.g., as indicated by the interconnections 1704). In this example, the neural network 1700 includes several nodes $\mu_{x1}$, $\mu_{x2}$, and $\mu_{x3}$, each of which receives respective input values from the nodes i $i_1$, $i_2$, $i_3$, and $i_4$, applies a respective transformation to the received values, and outputs the transformed values to one or more of the nodes $y_1$ and $y_2$.

In some implementations, nodes of the hidden layer 1706b can receive one or more input values, and transform the one or more received values according to a mathematical transfer function. As an example, the values that are received by a node can be used as input values in particular transfer function, and the value that is output by the transfer function can be used as the output of the node. In some implementations, a transfer function can be a non-linear function. In some implementations, a transfer function can be a linear function.

In some implementations, a transfer function can weight certain inputs differently than others, such that certain inputs have a greater influence on the output of the node than others. For example, in some implementations, a transfer function can weight each of the inputs by multiplying each of the inputs by a respective coefficient. Further, in some implementations, a transfer function can apply a bias to its output. For example, in some implementations, a transfer function can bias its output by a particular offset value.

For instance, a transfer function of a particular node can be represented as:

$$Y = \sum_{i=1}^{n}(weight_i * input_i) + bias,$$

where $weight_i$ is the weight that is applied to an input $input_i$, bias is a bias or offset value is that is applied to the sum of the weighted inputs, and Y is the output of the node.

The nodes of the output layer 1706c receive input values (e.g., from the nodes of the hidden layer 1706b) and output the received values. In some implementations, nodes of the output layer 1706c can also receive one or more input values, and transform the one or more received values according to a mathematical transfer function (e.g., in a similar manner as the nodes of the hidden layer 1706b). As an example, the values that are received by a node can be used as input values in particular transfer function, and the value that is output by the transfer function can be used as the output of the node. In some implementations, a transfer function can be a non-linear function. In some implementations, a transfer function can be a linear function.

In some implementations, at least some of the nodes of the output layer 1706c can correspond to respective candidate content items for inclusion in an electronic message. As an example, each node of the output layer 1706c can correspond to a different candidate content items for inclusion in an electronic message, and the value for that node can represent a confidence level for that candidate content item (e.g., an estimated likelihood that the candidate content item is consistent with the content that the user intended to include in the electronic message).

In this example, the neural network 1700 includes two output nodes $y_1$ and $y_2$, each of which receives respective input values from the nodes $\mu_{x1}$, $\mu_{x2}$, and $\mu_{x3}$, applies a respective transformation to the received values, and outputs the transformed values as outputs of the neural network 1700.

Although FIG. 17 shows example nodes and example interconnections between them, this is merely an illustrative example. In practice, a neural network can include any number of nodes that are interconnected according to any arrangement. Further, although FIG. 17 shows a neural network 1700 having a single hidden layer 1706b, in practice, a network can include any number of hidden layers (for example, one, two, three, four, or more), or none at all.

Figure 18:
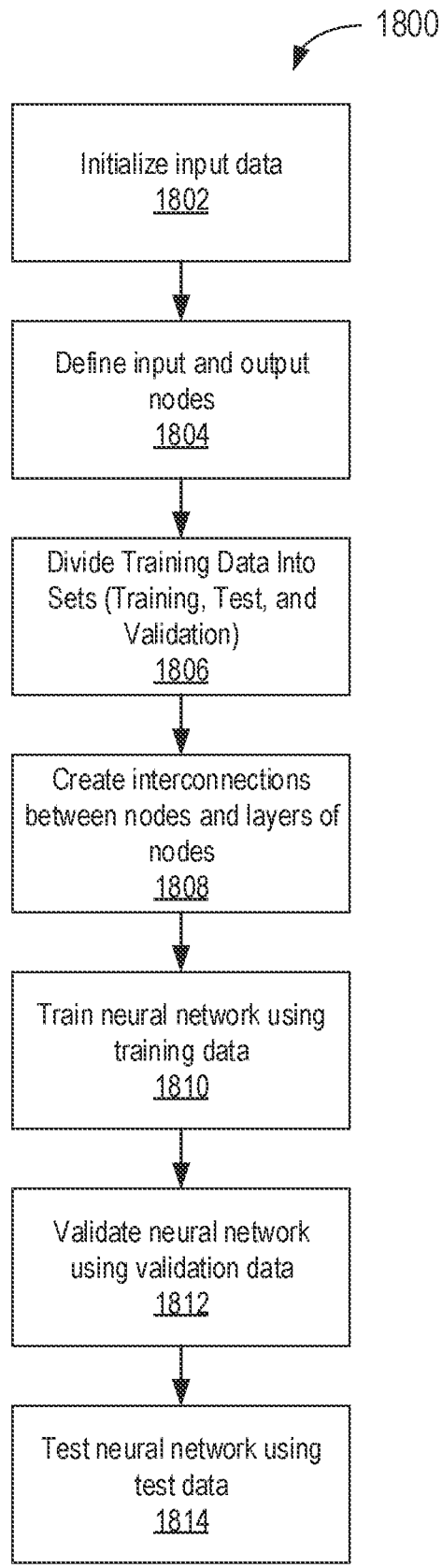
FIG. 18 is a diagram of an example process for training a neural network.

In some implementations, the neural network 1700 can be trained based on training data. An example process 1800 for training the neural network 1800 is shown in FIG. 18.

According to the process 1800, the wearable multimedia device 101 and/or the content generation module 1200 initializes the input data that is used to train the neural network 1700 (block 1802). As an example, the wearable multimedia device 101 and/or the content generation module 1200 can retrieve training data including sets of previously collected input data (e.g., historical sets of input data 1202), and content items and/or electronic messages that were previously generated in the context of the previously collected input data (e.g., historical content items and/or electronic messages).

Further, the wearable multimedia device 101 and/or the content generation module 1200 defines the input and the output nodes of the neural network 1700 (block 1804). For example, the wearable multimedia device 101 and/or the content generation module 1200 can select one or more of the types of data included in the training data, and specify that they be used as respective input nodes in the neural network 1700 (e.g., as inputs for respective nodes of the input layer 1706a). As another example, the wearable multimedia device 101 and/or the content generation module 1200 can specify each of the outputs of the neural network (e.g., the outputs of each of the nodes of the output layer 1706c). For instance, at least some of the nodes of the output layer 1706c can correspond to candidate content items and/or electronic messages.

The wearable multimedia device 101 and/or the content generation module 1200 divides the training data into different sets (block 1806). For example, the training data can be divided into a training set, a validation set, and a test set.

The training set can be used to train the neural network 1700. For example, the training set can be used to identify patterns, trends, or correlations between the inputs and the outputs of the neural network 1700, and to express those relationships using the nodes and interconnections between them.

The validation set can be used to tune the performance of the trained neural network 1700. For example, the validation set can be used to determine a difference between the output of the neural network 1700 given certain inputs, and an expected output. The configuration of the neural network can be modified based on the difference (e.g., such that the output of the neural network 1700 better matches the expected result).

The test set can be used to evaluate the performance of the trained neural network 1700 (for instance, after it has been tuned based on the validation set). For example, the test set can be used to determine a difference between the output of the neural network 1700 given certain inputs, and an expected output. This difference can indicate the ability of the neural network 1700 to accurately predict a particular outcome given particular inputs. For example, the difference can indicate the ability of the neural network 1700 to accurately select a content item that is consistent with the content that the user intended to include in an electronic message, based on the gathered input data.

Further, the wearable multimedia device 101 and/or the content generation module 1200 creates interconnections between the nodes and layers of nodes in the neural network 1700 (block 1808). In some implementations, an interconnection between two or more nodes can be in the forward direction (e.g., data can be passed between nodes in the direction of the input to the output of the neural network 1700). This may be referred to as a "feed forward" interconnection. In some implementations, an interconnection between two or more nodes can be in the backward direction (e.g., data can be passed between nodes in the direction of the output to the input of the neural network 1700). This may be referred to as a "back propagation" interconnection.

Further, the wearable multimedia device 101 and/or the content generation module 1200 creates layers of nodes. For example, the wearable multimedia device 101 and/or the content generation module 1200 can specify that the neural network include N layers of nodes, such as one input layer, one output layer, and N-2 hidden layers. Other arrangements of layers are also possible, depending on the implementation.

Further, the wearable multimedia device 101 and/or the content generation module 1200 trains the neural network 1700 using the training set (block 1810). In some implementations, the wearable multimedia device 101 and/or the content generation module 1200 can perform the training based on a supervised learning method. As an example, the training set can include example input data and output data. Based on the arrangement of the nodes and the interconnections between them, the wearable multimedia device 101 and/or the content generation module 1200 can identify transfer functions for each of the nodes that would result in the output of the neural network 1700 matching or otherwise being similar to the output data in the training set, given the same input data. In some implementations, the wearable multimedia device 101 and/or the content generation module 1200 can select particular weights or biases for each of the transfer functions. In some implementations, this can be performed iteratively (e.g., using successive sets of training data).

After training the neural network 1700, the wearable multimedia device 101 and/or the content generation module 1200 validates the neural network 1700 using the validation set (block 1812). As an example, the validation set can include example input data and output data. The wearable multimedia device 101 and/or the content generation module 1200 can input the input data into the neural network 1700, and compare the output of the neural network 1700 to the output data of the validation set. In some implementations, the wearable multimedia device 101 and/or the content generation module 1200 can calculate an "error" of the neural network 1700, such as the difference between the output data of the validation set and the output of the neural network 1700.

In some implementations, the wearable multimedia device 101 and/or the content generation module 1200 can tune the neural network 1700 based on the validation set. For example, the wearable multimedia device 101 and/or the content generation module 1200 can modify the arrangement of the nodes, the interconnections between them, and/or the transfer functions (e.g., the weights and biases) such that the error of the neural network 1700 is reduced.

In some implementations, this can be performed iteratively (e.g., using successive sets of validation data) until particular criteria are met. For example, in some implementations, the wearable multimedia device 101 and/or the content generation module 1200 can iteratively tune the neural network 1700 until the error of the neural network 1700 is less than a particular threshold value. As another example, the wearable multimedia device 101 and/or the content generation module 1200 can iteratively tune the neural network 1700 until the neural network 1700 exhibits a sufficiently low false positive rate (e.g., the rate in which it predicts that a particular content item and/or electronic message is consistent with the content that the user intended to include in an electronic message, when in fact it is not) and/or a sufficiently low false negative rate (e.g., the rate in which it predicts that a particular content item and/or electronic message is not consistent with the content that the user intended to include in an electronic message, when in fact it is).

After training and tuning the neural network 1700, the wearable multimedia device 101 and/or the content generation module 1200 tests the neural network 1200 using the test set (block 1314). As an example, the test set can include example input data and output data. The wearable multimedia device 101 and/or the content generation module 1200 can input the input data into the neural network 1700, and compare the output of the neural network 1700 to the output data of the test set. In some implementations, the wearable multimedia device 101 and/or the content generation module 1200 can calculate an "error" of the neural network 1200, such as the difference between the output data of the test set and the output of the neural network 1700. This error can represent the predictive performance of the neural network 1700. For example, a high error can indicate that the neural network 1700 is not likely to predict an outcome accurately, given certain input data. Conversely, lower error can indicate that the neural network 1700 is likely to predict an outcome accurately, given certain input data.

Additional Example Processes

Figure 19:
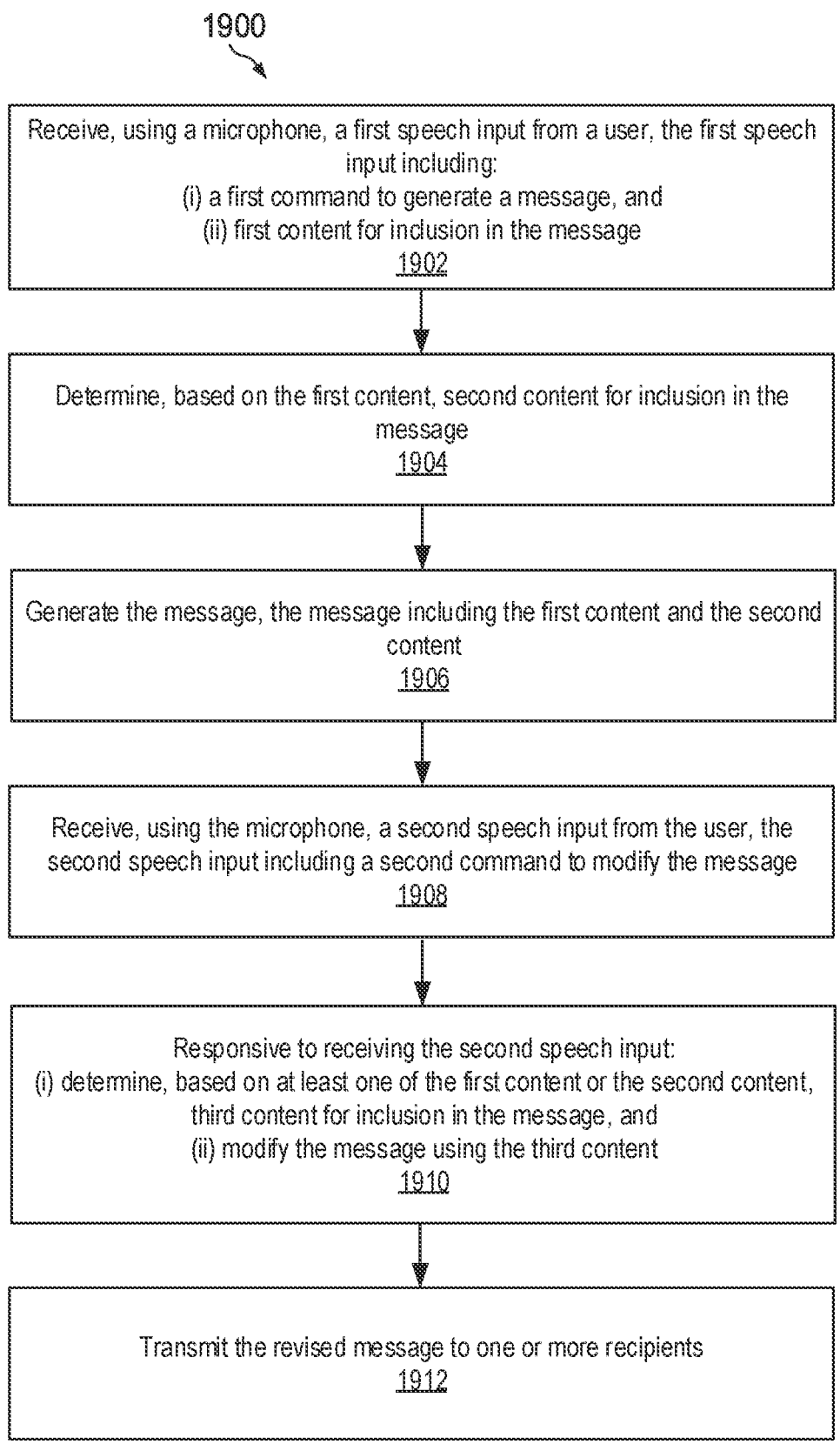
FIG. 19 is flow diagram of a process for composing and transmitting an electronic message, according to an embodiment.

FIG. 19 is a flow diagram of an example process 1900 for composing and transmitting an electronic message, according to an embodiment. Process 1900 can be implemented using wearable multimedia devices 101 described in reference to FIGS. 1-9.

According to the process 1900, a wearable multimedia device receives a first speech input from a user using a microphone of the wearable multimedia device (block 1902). The first speech input includes a first command to generate a message, and first content for inclusion in the message.

The wearable multimedia device determines second content for inclusion in the message based on the first content (block 1904).

In some implementations, the first content can include a first category of data, and the second content can include a second category of data different from the first category of data. Further, in some implementations, the second content is not included in the first speech input. As an example, the first category of data can be one of: (i) the one or more recipients, (ii) a location associated with the message, or (iii) a time associated with the message. Further, the second category of data can be another one of: (i) the one or more recipients, (ii) the location associated with the message, or (iii) the time associated with the message.

In some implementations, the first content can include an indication of the one or more recipients. Further, generating the second content can include inferring the second content based on the one or more recipients.

In some implementations, inferring the second content based on the one or more recipients can include obtaining calendar data associated with the one or more recipients, and inferring the second content based on the calendar data. For example, the second content can include an invitation to an event and a time associated with the event, and the time can be inferred based on the calendar data.

In some implementations, inferring the second content based on the one or more recipients can include obtaining historical data associated with the one or more recipients, and inferring the second content based on the historical data. For example, the second content can include an invitation to an event and a venue associated with the event, and the venue can be inferred based on the historical data.

In some implementations, inferring the second content based on the one or more recipients can include obtaining first location data associated with the user, obtaining second location associated with the one or more recipients, and inferring the second content based on the first location data and the second location data. As an example, the second content can include an invitation to an event and a venue associated with the event, and the venue can be inferred based on the first location data and the second location data. As another example, the second content can include an invitation to an event and a time associated with the event, and the time can be inferred based on the first location data and the second location data.

In some implementations, the second content can include a venue associated with the event, and the venue can be inferred based on weather data (e.g., data regarding the weather at the venue).

In some implementations, inferring the second content based on the one or more recipients can include determining a relationship between the user and the one or more recipients, and inferring the second content based on the relationship between the user and the one or more recipients. In some implementations, the relationship can be at least one of a familial relationship or a workplace relationship.

In some implementations, the first content can include an indication of a location associated with the message. Further, generating the second content can include inferring the second content based on the location.

In some implementations, inferring the second content based on the one or more recipients can include obtaining map data associated with the location, and inferring the second content based on the map data. For example, the second content can include an invitation to an event and a venue associated with the event, and the venue can be inferred based on the map data.

The wearable multimedia device generates the message (block 1906). The message includes the first content and the second content.

The wearable multimedia device receives a second speech input from the user using the microphone (block 1908). The second speech input includes a second command to modify the message.

In some implementations, the second speech input can include at least one of: (i) a modification to the one or more recipients, (ii) a modification to the location associated with the message, or (iii) a modification to the time associated with the message.

In some implementations, the second command can include a command to add a third category of data to the message. The third category of data can different from the first category of data and the second category of data.

In response to receiving the second speech input, the wearable multimedia device (i) determines third content for inclusion in the message based on at least one of the first content or the second content, and (ii) modifies the message using the third content (block 1910).

In some implementations, content of the modified message can be different from either of the first speech input or the second speech input.

The wearable multimedia device transmits the modified message to one or more recipients (block 1912).

In some implementations, the method 1900 can also include determining at least one of a salutation, a valediction, or a signature for inclusion in the message. This determination can be made based on the one or more recipients. Further, the message can be generated such that it includes at least one of the salutation, the valediction, or the signature.

In some implementations, the method 1900 can also include determining a transmission time for transmitting the modified message. The transmission time can be determined based on an availability of the one or more recipients.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving, using a microphone of a wearable multimedia device, a first speech input from a user, wherein the first speech input comprises:
a first command to generate a message, and
first content for inclusion in the message, wherein the first content comprises an indication of one or more recipients;
determining, by the wearable multimedia device based on the first content, second content for inclusion in the message, wherein determining the second content comprises inferring the second content based on the one or more recipients, wherein inferring the second content based on the one or more recipients comprises:
obtaining calendar data associated with the one or more recipients, and
inferring the second content based on the calendar data;
generating, by the wearable multimedia device, the message, wherein the message comprises the first content and the second content;
receiving, using the microphone, a second speech input from the user, wherein the second speech input comprises a second command to modify the message;
responsive to receiving the second speech input:
determining, by the wearable multimedia device based on at least one of the first content or the second content, third content for inclusion in the message, and
modifying, by the wearable multimedia device, the message using the third content; and
transmitting, by the wearable multimedia device, the modified message to the one or more recipients.

2. The method claim 1, wherein the first content comprises a first category of data, and
wherein the second content comprises a second category of data different from the first category of data, wherein the second content is not included in the first speech input.

3. The method of claim 2, wherein the first category of data is one of:
the one or more recipients,
a location associated with the message, or
a time associated with the message.

4. The method of claim 3, wherein the second category of data is another one of:
the one or more recipients,
the location associated with the message, or
the time associated with the message.

5. The method of claim 4, wherein the second speech input comprises at least one of:
a modification to the one or more recipients,
a modification to the location associated with the message, or
a modification to the time associated with the message.

6. The method of claim 2, wherein the second command comprises a command to add a third category of data to the message, wherein the third category of data different from the first category of data and the second category of data.

7. The method of claim 1, wherein content of the modified message is different from either of the first speech input or the second speech input.

8. The method of claim 1, wherein the second content comprises an invitation to an event and a time associated with the event, wherein the time is inferred based on the calendar data.

9. The method of claim 1, wherein inferring the second content based on the one or more recipients comprises:
obtaining historical data associated with the one or more recipients, and
inferring the second content based on the historical data.

10. The method of claim 9, wherein the second content comprises an invitation to an event and a venue associated with the event, wherein the venue is inferred based on the historical data.

11. The method of claim 1, wherein inferring the second content based on the one or more recipients comprises:
obtaining first location data associated with the user,
obtaining second location data associated with the one or more recipients, and
inferring the second content based on the first location data and the second location data.

12. The method of claim 11, wherein the second content comprises an invitation to an event and a venue associated with the event, and wherein the venue is inferred based on the first location data and the second location data.

13. The method of claim 11, wherein the second content comprises an invitation to an event and a time associated with the event, and wherein the time is inferred based on the first location data and the second location data.

14. The method of claim 13, wherein the second content comprises a venue associated with the event, and wherein the venue is inferred based on weather data.

15. The method of claim 1, wherein inferring the second content based on the one or more recipients comprises:
determining a relationship between the user and the one or more recipients, and
inferring the second content based on the relationship between the user and the one or more recipients.

16. The method of claim 15, wherein the relationship is at least one of:
a familial relationship, or
a workplace relationship.

17. The method of claim 1, wherein the first content comprises an indication of a location associated with the message, and wherein determining the second content comprises inferring the second content based on the location.

18. The method of claim 17, wherein inferring the second content based on the one or more recipients comprises:
obtaining map data associated with the location, and inferring the second content based on the map data.

19. The method of claim 18, wherein the second content comprises an invitation to an event and a venue associated with the event, and wherein the venue is inferred based on the map data.

20. The method of claim 1, further comprising:
determining, based on the one or more recipients, at least one of a salutation, a valediction, or a signature for inclusion in the message,
wherein the message further comprises at least one of the salutation, the valediction, or the signature.

21. The method of claim 1, further comprising:
determining a transmission time for transmitting the modified message, wherein the transmission time is determined based on an availability of the one or more recipients.

22. A wearable multimedia device, comprising:
at least one microphone;
one or more processors; and
memory storing instructions that, when executed by the one or more processors, cause the one or more processors to perform operations comprising:
  receiving, using the at least one microphone, a first speech input from a user, wherein the first speech input comprises:
    a first command to generate a message, and
    first content for inclusion in the message, wherein the first content comprises an indication of one or more recipients;
  determining, based on the first content, second content for inclusion in the message, wherein determine the second content comprises inferring the second content based on the one or more recipients, wherein inferring the second content based on the one or more recipients comprises:
    obtaining first location data associated with the user,
    obtaining second location data associated with the one or more recipients, and
    inferring the second content based on the first location data and the second location data,
  wherein the second content comprises an invitation to an event, a time associated with the event, and a venue associated with the event,
  wherein the time is inferred based on the first location data and the second location data, and
  wherein the venue is inferred based on weather;
  generating the message, wherein the message comprises the first content and the second content;
  receiving, using the at least one microphone, a second speech input from the user, wherein the second speech input comprises a second command to modify the message;
  responsive to receiving the second speech input:
    determining, based on at least one of the first content or the second content, third content for inclusion in the message, and
    modifying the message using the third content; and
  transmitting the modified message to the one or more recipients.

23. One or more non-transitory computer-readable media storing instructions that, when executed by at least one processor, cause the at least one processor to perform operations comprising:
  receiving, using a microphone of a wearable multimedia device, a first speech input from a user, wherein the first speech input comprises:
    a first command to generate a message, and
    first content for inclusion in the message, wherein the first content comprises an indication of one or more recipients;
  determining, by the wearable multimedia device based on the first content, second content for inclusion in the message, wherein determining the second content comprises inferring the second content based on the one or more recipients, wherein inferring the second content based on the one or more recipients comprises:
    determining a relationship between the user and the one or more recipients, and
    inferring the second content based on the relationship between the user and the one or more recipients;
  generating, by the wearable multimedia device, the message, wherein the message comprises the first content and the second content;
  receiving, using the microphone, a second speech input from the user, wherein the second speech input comprises a second command to modify the message;
  responsive to receiving the second speech input:
    determining, by the wearable multimedia device based on at least one of the first content or the second content, third content for inclusion in the message, and
    modifying, by the wearable multimedia device, the message using the third content; and
  transmitting, by the wearable multimedia device, the modified message to the one or more recipients.

* * * * *